(12) United States Patent
Tsai

(10) Patent No.: US 11,306,914 B2
(45) Date of Patent: Apr. 19, 2022

(54) GAS COMBUSTOR HAVING FUNCTION OF ADJUSTING COMBUSTING ANGLE

(71) Applicant: ROBURN COMPANY LTD., New Taipei (TW)

(72) Inventor: Chin-Lin Tsai, New Taipei (TW)

(73) Assignee: ROBURN COMPANY LTD., New Taipei (TW)

( * ) Notice: Subject to any disclaimer, the term of this patent is extended or adjusted under 35 U.S.C. 154(b) by 246 days.

(21) Appl. No.: 16/709,842

(22) Filed: Dec. 10, 2019

(65) Prior Publication Data

US 2020/0208834 A1    Jul. 2, 2020

(30) Foreign Application Priority Data

Dec. 28, 2018   (TW) .................................. 107217779
Oct. 30, 2019   (TW) .................................. 108214336

(51) Int. Cl.

| *F23C 99/00* | (2006.01) |
|---|---|
| *F23D 14/28* | (2006.01) |
| *A45D 20/06* | (2006.01) |
| *F02C 7/264* | (2006.01) |
| *F23D 11/40* | (2006.01) |
| *F23D 14/14* | (2006.01) |

(52) U.S. Cl.
CPC ............ *F23C 99/001* (2013.01); *F23D 14/28* (2013.01); *A45D 2020/065* (2013.01); *F02C 7/264* (2013.01); *F23D 11/406* (2013.01); *F23D 14/14* (2013.01); *F23D 2207/00* (2013.01)

(58) Field of Classification Search
CPC ........ F23D 14/28; F23D 14/14; F23D 11/406; F23C 99/001
USPC .......................................... 431/255, 153, 276
See application file for complete search history.

(56) References Cited

U.S. PATENT DOCUMENTS

| 5,199,865 A   * | 4/1993  | Liang ..................... F23Q 2/164    |
|---|---|---|
|                 |         | 219/262                                   |
| 5,466,149 A     | 11/1995 | Tsai                                      |
| 5,564,919 A     | 10/1996 | Tsai                                      |
| 5,647,738 A   * | 7/1997  | Tsai ........................ F23D 14/28  |
|                 |         | 431/247                                   |
| 5,735,684 A     | 4/1998  | Tsai                                      |
| 5,816,794 A     | 10/1998 | Tsai                                      |
| 2016/0097530 A1* | 4/2016 | Tsai ........................ F23D 14/28  |
|                 |         | 431/255                                   |
| 2018/0111213 A1* | 4/2018 | Mantes .................. B23K 3/027     |

* cited by examiner

*Primary Examiner* — Avinash A Savani
(74) *Attorney, Agent, or Firm* — Guice Patents PLLC

(57) ABSTRACT

A gas combustor having function of adjusting combusting angle includes: a fixed housing having a top end thereof transversally formed with a rod hole; and a rotary housing pivoted with the fixed housing, where one side of the rotary housing is formed with a shaft hole having a plurality of annularly-arranged teeth slots for receiving a locking mechanism having an unlocking press button, a connection rod extrudes from an inner surface of the unlocking press button to pass the shaft hole, be sleeved with a stretch spring and enter the rod hole, the connection rod is connected to a passive member in the fixed housing, the passive member has at least one convex tooth protruding toward the plurality of teeth slots, and each of the at least one convex tooth is to be inserted and positioned in one of the teeth slots to form a locked status.

21 Claims, 22 Drawing Sheets

A-A

GAS COMBUSTOR HAVING FUNCTION OF ADJUSTING COMBUSTING ANGLE

BACKGROUND OF THE INVENTION

1. Field of the Invention

The present invention relates to a gas combustor, especially to a gas combustor having function of adjusting combusting angle.

2. Description of Related Art

Fire is a must have element in our lives, with fire, we can cook food, can be provided with lighting, and the fire can also be used for combustion operations such as forging, soldering and welding. Take a gas combustor for example, e.g. a refillable lighter or a portable gas stove, liquid gas is provided therein for lighting objects or cooking food, so the gas combustor still plays an important role in our lives which cannot be easily replaced.

With the convenience provided by the canned gas, there are two types of gas combustors in the marketplace, U.S. Pat. No. 5,466,149 (corresponding to Taiwan Patent Registration No. 110192) and U.S. Pat. No. 5,564,919 (corresponding to Taiwan Patent Registration No. 112652) have disclosed a gas combustor, in which a gas discharge valve at the top end of a canned gas is pivoted with a filling nozzle at the bottom end of a heating torch, so liquid gas can be injected into a fuel storage tank, thereby enabling a gas discharge device disposed at the top end of in a fuel gas storage tank to be provided with gas and a flame device to be provided with fuel gas. Another type of gas combustor is illustrated as following: U.S. Pat. No. 5,735,684 (corresponding to Taiwan Patent Registration No. 134495) and U.S. Pat. No. 5,816,794 (corresponding to Taiwan Patent Registration No. 122521) have disclosed a gas combustor, in which a base is disposed at the bottom portion thereof as to be pivoted with a canned gas available in the commercial market, and after the fuel in the canned gas is gasified, the gas can be supplied to a combustion device disposed at an upper portion of the gas combustor, thereby being suitable to be applied in combustion operations, for example soldering, welding or others.

However, in the above-mention gas combustors, the angle defined by the flame device and the gas storage tank and the angle defined by the base and the combustion device are fixedly arranged, for example the flame device is arranged in 90 degrees relative to the gas storage tank, and the combustion device is arranged greater than 90 degrees, such as 125 degrees, relative to the base, so that a user can hold the gas storage tank or the base for performing a combustion operation.

Moreover, disadvantages of the above-mentioned gas combustors are provided as follows. When the gas combustor is desired to be operated in a small operation space, because the angle of the combustion device is fixedly arranged, if the length is not sufficient, the combustion device could not reach an object to be heated, and another gas combustor with a longer length has to be utilized for replacement, thus the user may need to prepare gas combustors with various angles for being suitable to be applied in different operation spaces.

Accordingly, if the gas combustor could be provided with a function of adjusting combustion angles, the combustion angle can be properly adjusted with respect to different operation spaces, so that the combustion operation can be facilitated, meanwhile unnecessary waste for buying gas combustors with different angles can be prevented; as such, the above-mentioned shortages and disadvantages shall be seriously concerned by the skilled people in the art.

SUMMARY OF THE INVENTION

One primary objective of the present invention is to provide a gas combustor having function of adjusting combusting angle, which has advantages of a combusting angle being capable of being properly adjusted with respect to different operation spaces, and saving unnecessary waste for buying gas combustors with different angles.

For achieving said objective, one technical solution provided by the present invention is to provide a gas combustor having function of adjusting combusting angle, which includes: a fixed housing, having a left housing part and a right housing part, wherein a gas storage cylinder is disposed in the fixed housing, a top end of one of the left housing part and the right housing part is transversally formed with a rod hole and at least one insertion hole; and a rotary housing, pivoted with the fixed housing and connected to a combusting device, wherein one side of the rotary housing is formed with a first shaft hole having a plurality of annularly-arranged teeth slots for receiving a locking mechanism having an unlocking press button, a connection rod extrudes from an inner surface of the unlocking press button to pass the first shaft hole, be sleeved with a stretch spring and enter the rod hole, the connection rod is connected to a passive member in the fixed housing, the passive member has at least one convex tooth protruding toward the plurality of teeth slots, and each of the at least one convex tooth is to be inserted and positioned in one of the teeth slots to form a locked status; when the unlocking press button is pressed, the stretch spring is compressed, the passive member is able to be inwardly displaced with the connection rod, and the at least one convex tooth is released from the teeth slots, thereby terminating the locked status, and the unlocking press button is served as an axial core of the first shaft hole, so that the rotary housing having the combusting device is able to be directly rotated and adjusted till a desired combusting angle is provided.

For achieving said objective, another technical solution provided by the present invention is to provide a gas combustor having function of adjusting combusting angle, which includes: a fixed housing, having a left housing part and a right housing part, wherein one of the left housing part and the right housing part is formed with a rod hole; and a rotary housing, pivoted with the fixed housing and connected to a combusting device, wherein one side of the rotary housing is formed with a shaft hole having a plurality of annularly-arranged teeth slots for receiving a locking mechanism having an unlocking press button, a connection rod extrudes from an inner surface of the unlocking press button to pass the shaft hole, be sleeved with a stretch spring and enter the rod hole, the connection rod is connected to a passive member in the fixed housing, the passive member has at least one convex tooth protruding toward the plurality of teeth slots, and each of the at least one convex tooth is to be inserted and positioned in one of the teeth slots to form a locked status; when the unlocking press button is pressed, the stretch spring is compressed, the passive member is able to be inwardly displaced with the connection rod, and the at least one convex tooth is released from the teeth slots, thereby terminating the locked status, and the unlocking press button is served as an axial core of the shaft hole, so that the rotary housing having the combusting device is able to be directly rotated and adjusted till a desired combusting angle is provided.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
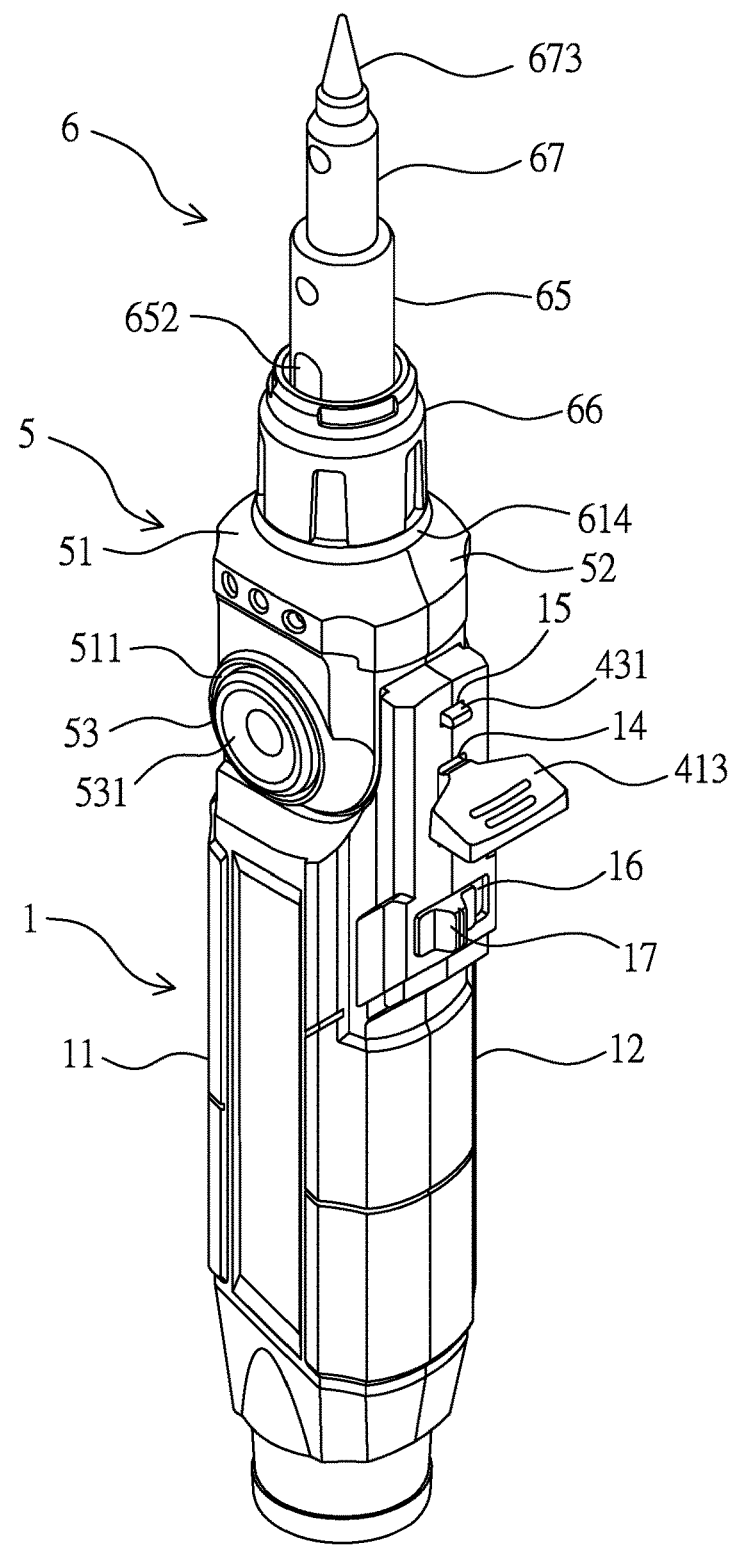
FIG. 1 is a perspective view illustrating the gas combustor according to the first embodiment of the present invention.

Please refer from FIG. 1 to FIG. 11, a gas combustor including a fixed housing 1, a gas storage cylinder 2, a gas discharging device 3, an igniting device 4, a rotary housing 5 and a combusting device 6 is disclosed according to the first embodiment of the present invention.

Figure 2:
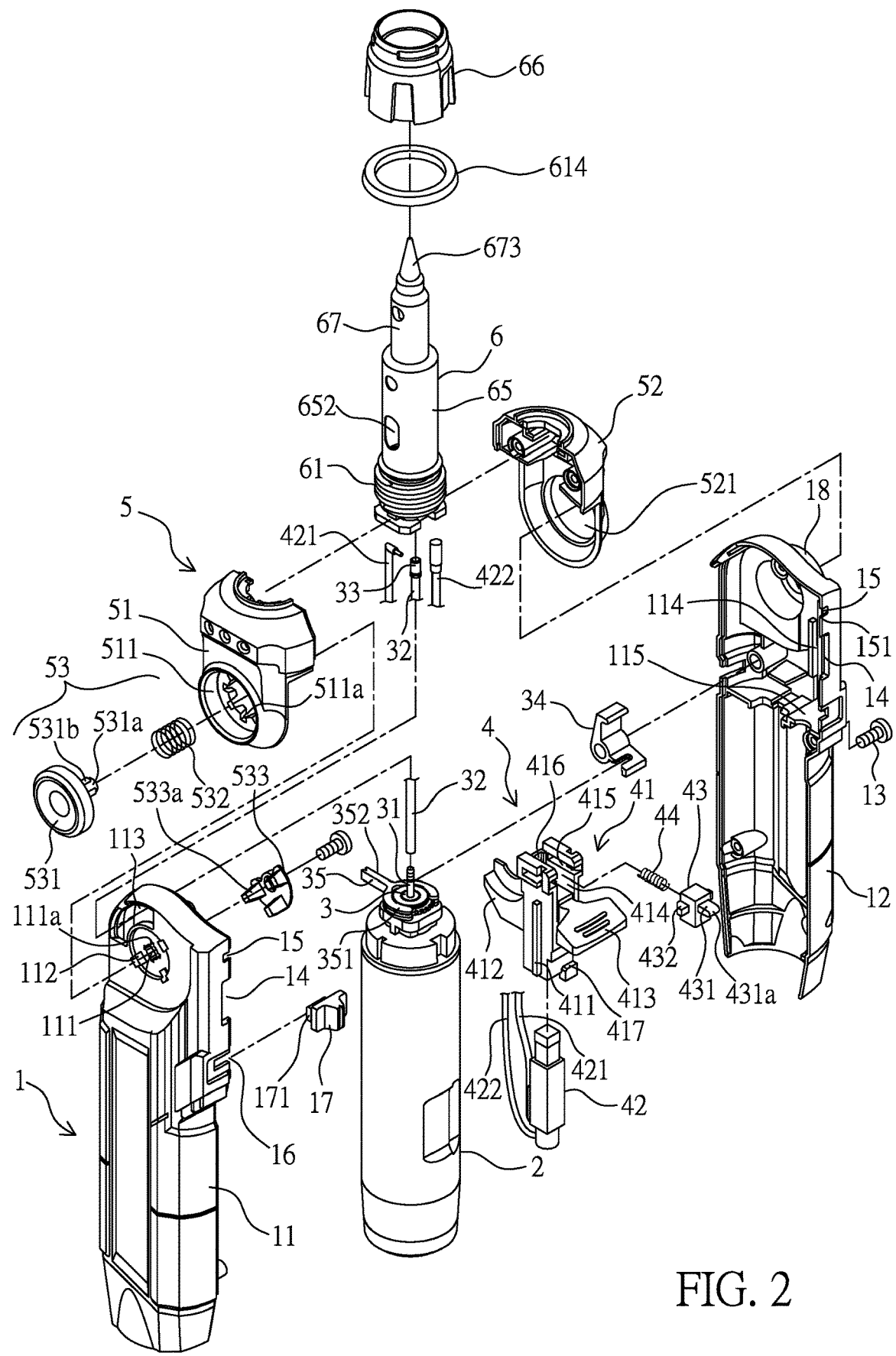
FIG. 2 is a perspective exploded view illustrating the gas combustor according to the first embodiment of the present invention.
Figure 3:
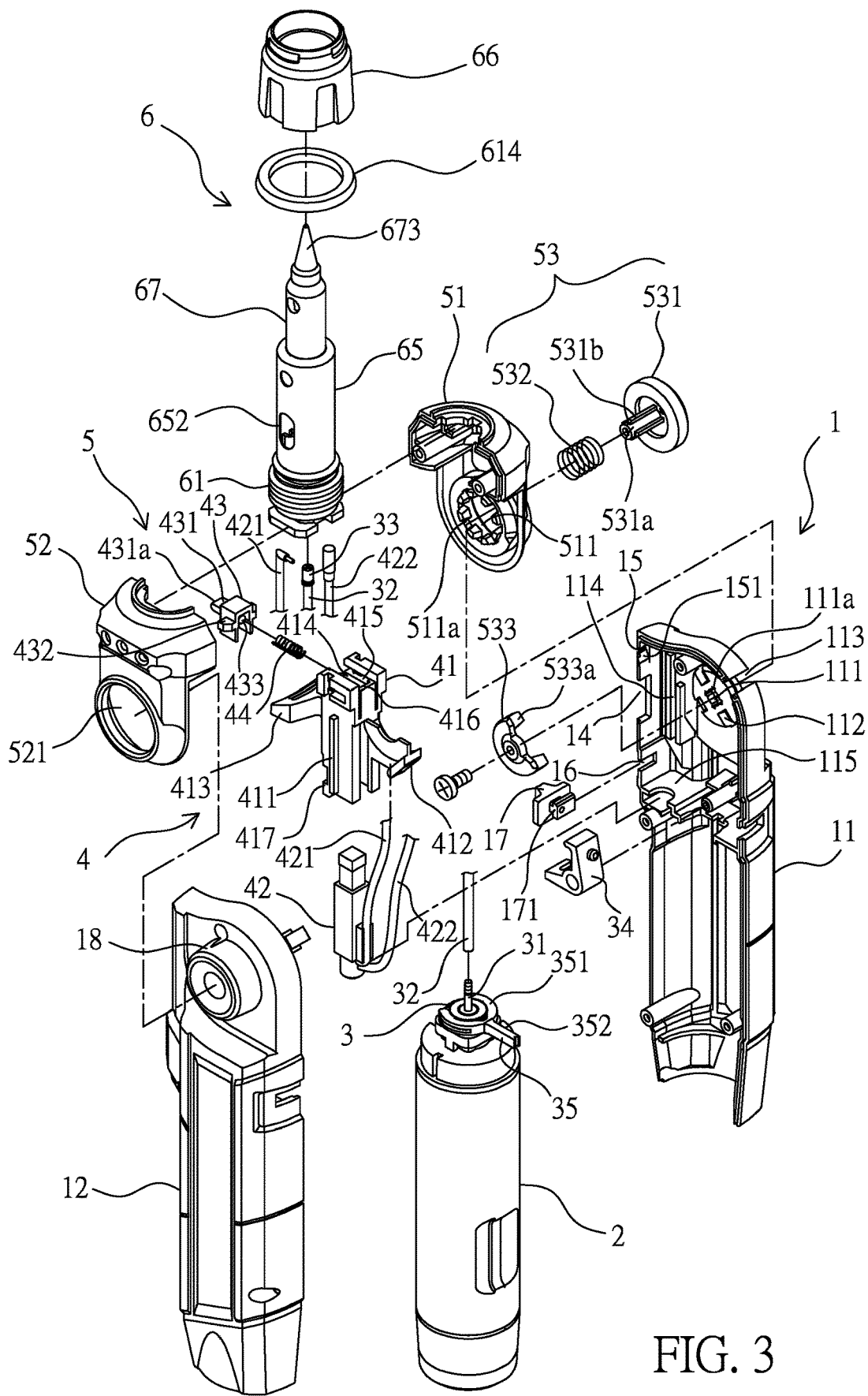
FIG. 3 is another perspective exploded view illustrating the gas combustor according to the first embodiment of the present invention.

The fixed housing 1 is utilized for being held by a hand of a user; as shown in FIG. 2 and FIG. 3, the fixed housing 1 is composed of a left housing part 11 and a right housing part 12 being engaged with each other. At least one connection member 13, for example a screw, is utilized for passing the right housing part 12 and locked on the left housing part 11. Wherein, the gas storage cylinder 2 is disposed in the fixed housing 1, the gas storage cylinder 2 is utilized for storing liquid gas, and a bottom end thereof is disposed with a conventional gas filling nozzle (known as prior art, therefore not provided with a code) used for allowing the liquid gas (gas fuel) to be replenished. The gas discharging device 3 is disposed at a top end of the gas storage cylinder 2.

Moreover, a top end of one of the left housing part 11 and the right housing part 12, for example the left housing part 11, is transversally formed with a rod hole 111 and at least one insertion hole 112.

The gas discharging device 3 has a gas discharging valve 31 disposed at a top end of the gas storage cylinder 2, a gas conveying soft pipe 32 having an upstream end thereof sleeved with the gas discharging valve 31 and penetrating a penetrated slot 113 formed at a top end of the fixed housing 1, a gas ejecting nozzle 33 disposed at a downstream end of the gas conveying soft pipe 32, and an L-shaped gas discharging press plate 34 having one end thereof sleeved with the gas discharging valve 31. The gas discharging press plate 34 is pivoted in the fixed housing 1, one end thereof is sleeved with the gas discharging valve 31, and another end thereof is abutted against a pressing unit 41 of the igniting device 4.

As such, then the another end of the gas discharging press plate 34 is pressed by the pressing unit 41, a leverage effect is generated by the gas discharging press plate 34 for allowing the gas discharging valve 31 to be lifted so as to form an opened status, and the liquid gas in the gas storage cylinder 2 is vaporized so as to enter the gas conveying soft pipe 32 from the gas discharging valve 31 and rapidly ejected from the gas ejecting nozzle 33 to enter the combusting device 6.

According to one embodiment of the present invention, the penetrated slot 113 is formed in the rod hole 111 and arranged at one side of the at least one insertion hole 112.

The gas discharging device 3 further has a regulation unit 35. The regulation unit 35 has a sleeve ring 351 transversally sleeved with the gas discharging valve 31, and a regulation rod 352 laterally extended from the sleeve ring 351. The regulation rod 352 is able to protrude from the fixed housing 1. As such, when the regulation rod 352 is pulled, the gas discharging valve 31 is able to be rotated with the sleeve ring 351, so that a gas discharge amount of the fuel gas can be regulated.

The igniting device 4 has the above-mentioned pressing unit 41 and a piezoelectric device 42, a pair of slide rails 411 and a pair of rail slots 114 are formed on a pair of side walls of the pressing unit 41 and a pair of inner walls of the fixed housing 1 to allow the pair of slide rails 411 and the pair of rail slots 114 to be mutually engaged and the pair of slide rails 411 to slide in the pair of rail slots 114, thereby enabling the piezoelectric device 42 disposed between the pair of inner walls to be pressed. A bottom end of the piezoelectric device 42 is abutted against a blocking sheet 115 disposed on the pair of inner walls of the fixed housing 1, so that the piezoelectric device 42 is provided with functions of being pressed and elastically recovered. The piezoelectric device 42 has a conductive wire 421 and a return wire 422, and the conductive wire 421 and the return wire 422 are able to both pass the penetrated slot 113 and extend into the combusting device 6.

As shown in FIG. 2 and FIG. 3, a pressing handle 412 protrudes from an inner side of the pressing unit 41 toward the gas discharging press plate 34 and is disposed above the gas discharging press plate 34, a press button 413 is disposed at an opposite side of the pressing handle 412 (in other words an outer side of the pressing unit) to protrude out of a button slot 14 formed on the fixed housing 1, thereby allowing the press button 413 shown in FIG. 1 to be exposed at the outer side of the fixed housing 1.

For preventing children from accidently operating the gas combustor, the pressing unit 41 further has a safety switch 43. The safety switch 43 is disposed and slidable in an accommodation slot 414 preformed at a top end of the pressing unit 41. An outer side of the safety switch 43 is protruded with a convex button 431 penetrating a key hole 15 formed on the fixed housing 1, and a pair of wing sheets 432 and a pair of wing slots 415 allowing the pair of wing sheets 432 to slide are oppositely formed at two sides of the safety switch 43 and corresponding adjacent surfaces of the accommodation slot 414, an inner side of the safety switch 43 is disposed with a spring tenon 433 (shown in FIG. 7a) allowing one end of an auxiliary spring 44 to be sleeved, and another end of the auxiliary spring 44 is abutted against a rear wall 416 oppositely formed in the accommodation slot 414, so that the safety switch 43 is able to elastically retract and slide in the accommodation slot 414, thereby forming a locked or an unlocked status of the safety switch 43.

Accordingly, when the safety switch 43 is not in an operating status, the convex button 431 longitudinally abuts against the key hole 15, thus the press button 413 is unable to be longitudinally pressed, thereby forming a locked and non-pressed status.

Figure 7A:
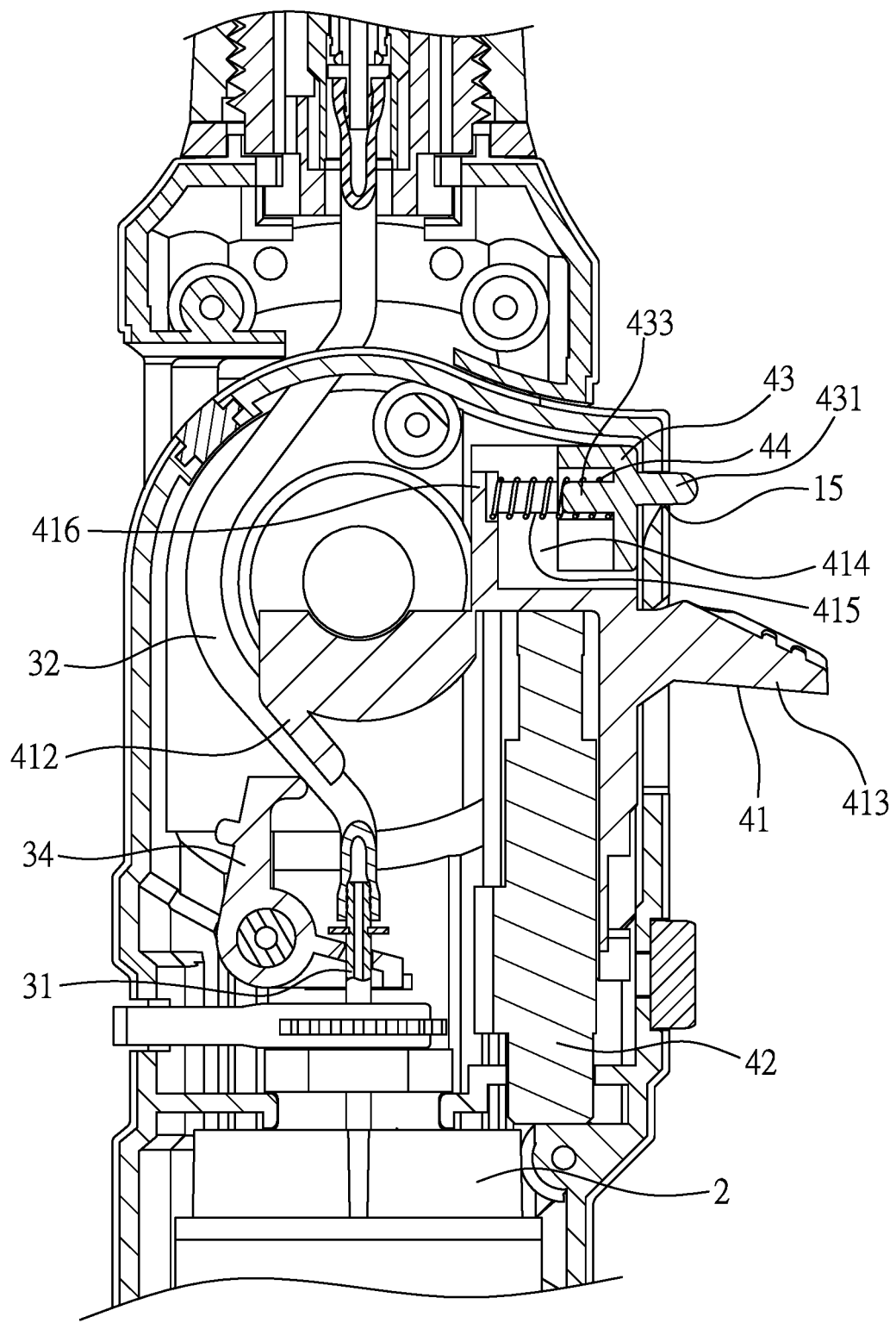
FIG. 7a to FIG. 7c are cross sectionals view illustrating an igniting operation of the gas combustor according to the first embodiment of the present invention.
Figure 7B:
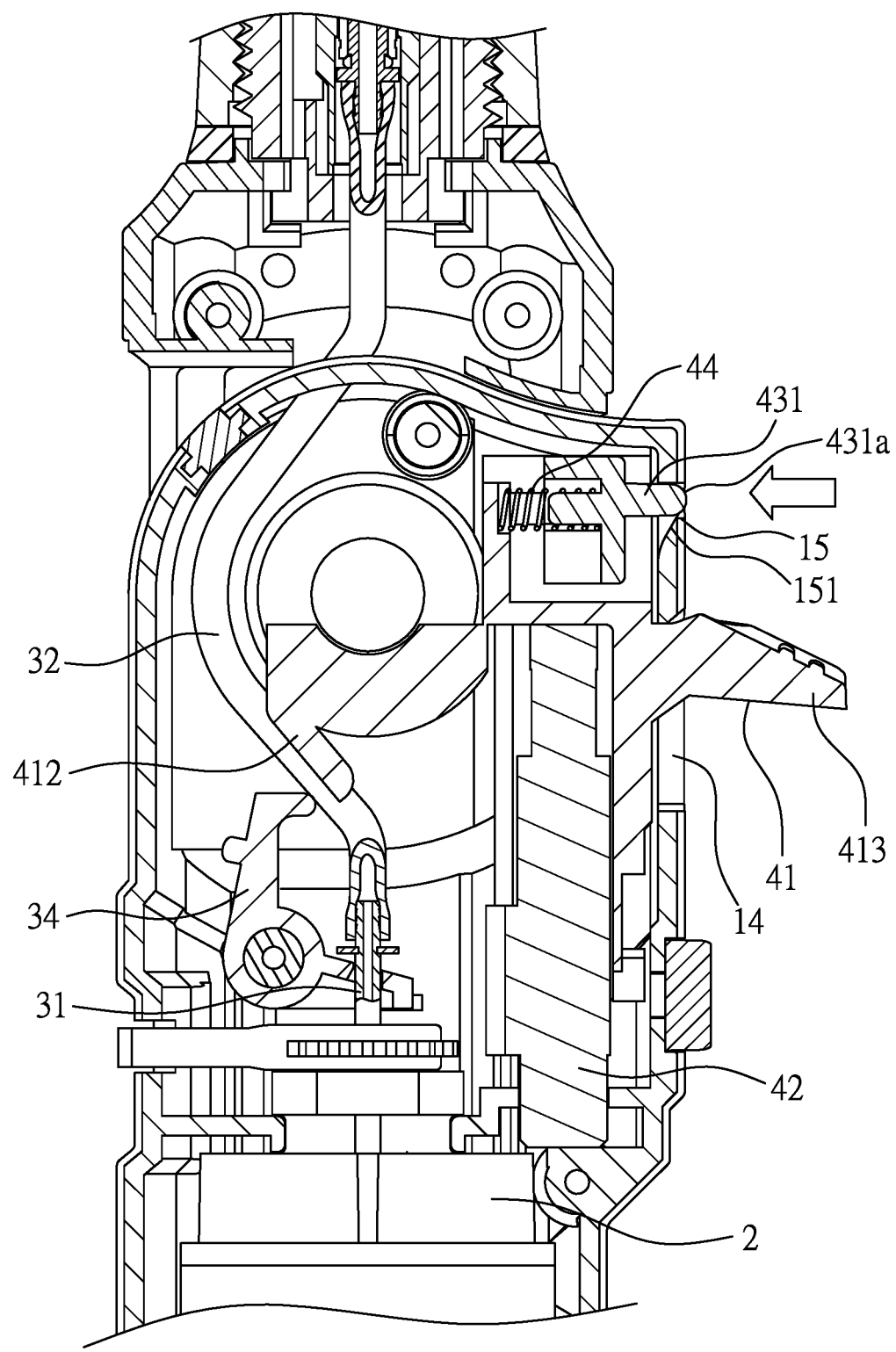

When the pressing unit 41 is desired to be unlocked for allowing the convex button 431 to smoothly retract into the key hole 15 to terminate the locked status, an outer side of the convex button 431 is formed with an arc-shaped end 431a, and a guiding arc-shaped surface 151 is formed and connected to an inner bottom end of the key hole 15. When the convex button 431 is pressed by a finger of the user for allowing the convex button 431 to be inwardly displaced, the auxiliary spring 44 is compressed, so that the arc-shaped end 431a is able to enter into the key hole 15 and be located above the guiding arc-shaped surface 151 (as shown in FIG. 7b), thereby forming an unlocked status.

Figure 7C:
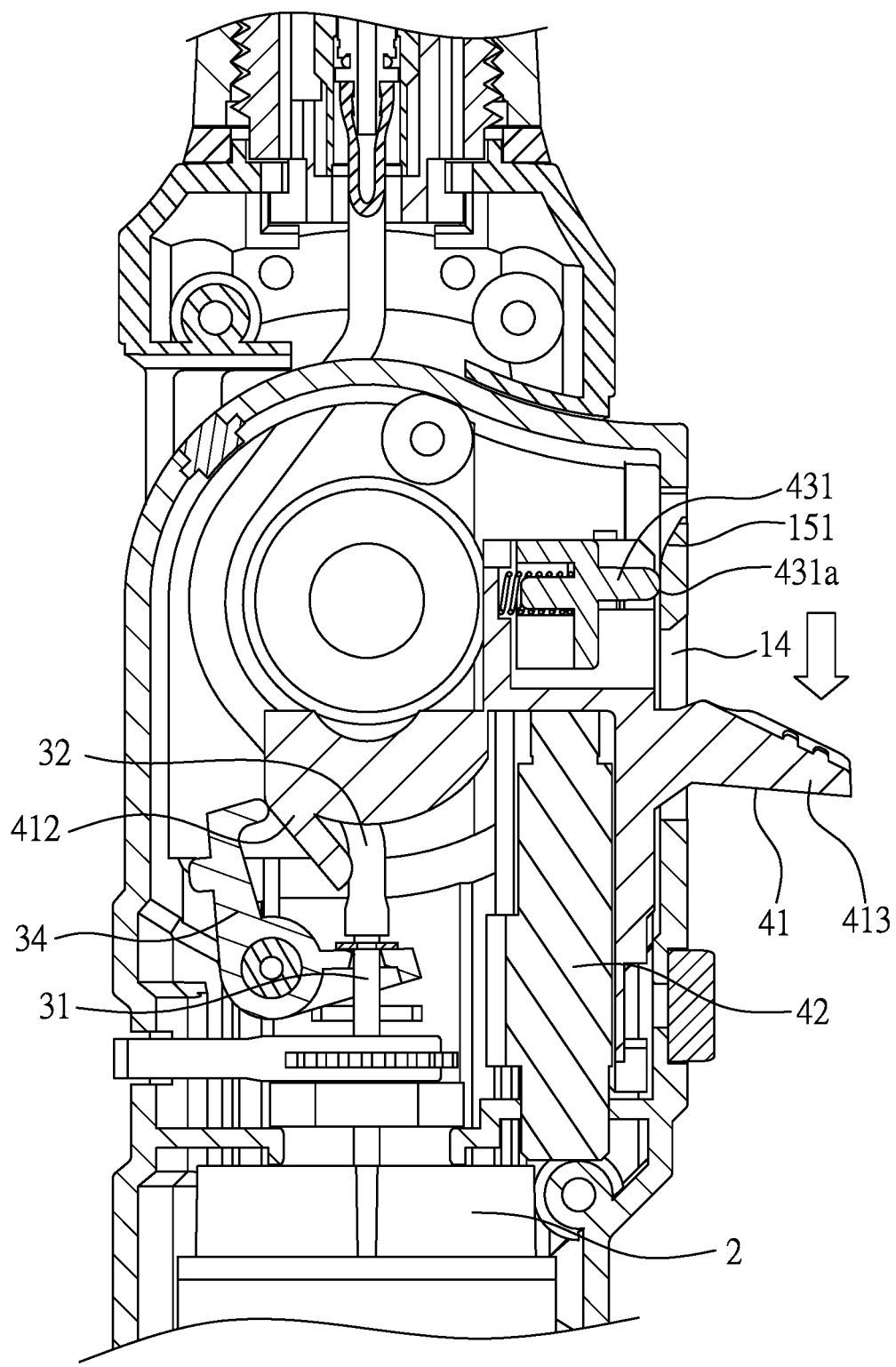
Figure 8A:
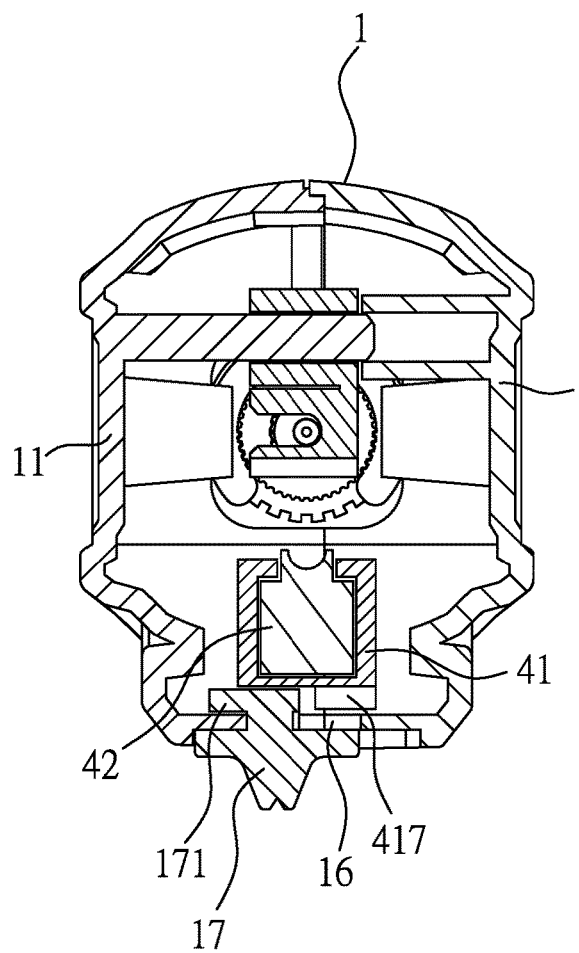
FIG. 8a is a cross sectional view illustrating the continuous button of the gas combustor not being operated according to the first embodiment of the present invention.
Figure 8B:
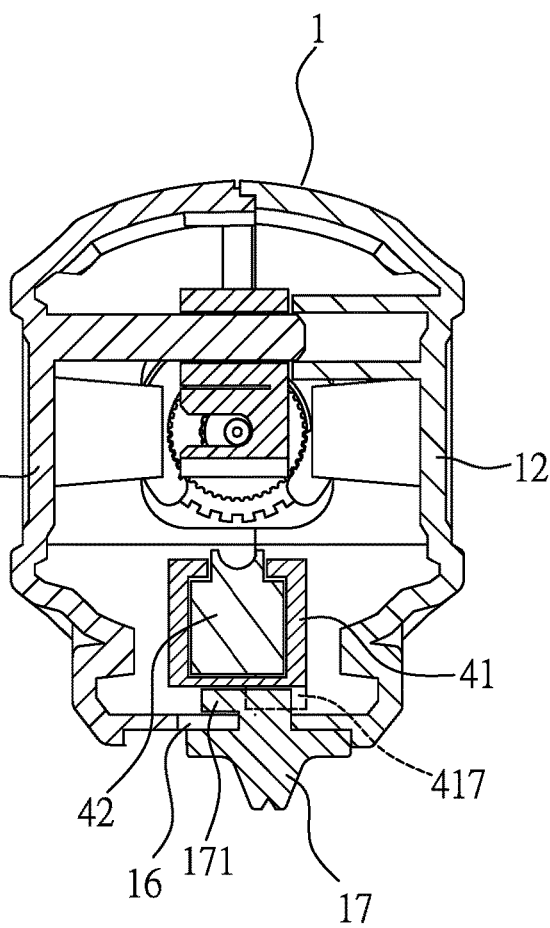
FIG. 8b is a cross sectional view illustrating the continuous button of the gas combustor being operated according to the first embodiment of the present invention.

Subsequently, the press button 413 is longitudinally pressed by the finger of the user, during a process of the press button 413 being longitudinally displaced in the button slot 14, the arc-shaped end 431a is downwardly displaced along the guiding arc-shaped surface 151, the piezoelectric device 42 is synchronously pressed by the pressing unit 41, so that the pressing handle 412 is able to press one end of the gas discharging press plate 34 during the displacement process, the gas discharging valve 3 (as shown in FIG. 7c) is lifted by another end of the gas discharging press plate 34, and the fuel gas is allowed to pass the gas conveying soft pipe 32 and be ejected by the gas ejecting nozzle 33 so as to enter the combusting device 6, and a current generated by the piezoelectric device 42 is transferred by the conductive wire 421, and a spark is generated at a location of a flame nozzle 63 inside the combusting device 6, thereby allowing a mixed fuel gas to be combusted, and the return wire 422 is utilized for guiding the current back to the piezoelectric device 42, so as to form an electric circulating loop.

The fixed housing 1 further has a continuous button 17, the continuous button 17 is disposed and slidable in a button hole 16 of the fixed housing 1, an inner end of the continuous button 17 is disposed with a buckle hook 171, and a buckle slot 417 allowing the buckle hook 171 to be buckled is disposed in the pressing unit 41 at a location corresponding to the buckle hook 171. When the pressing unit 41 is in a pressed status, the continuous button 17 is able to be further pushed, so that the buckle slot 417 is displaced into the buckle hook 171 so as to form a buckled locking status, thus the pressing unit 41 is unable to return to its original location, the pressing handle 412 is able to continuously press the gas discharging press plate 34, thereby enabling the gas discharging valve 31 to be kept in a gas supplying status, and an inconvenience of requiring the user to continuously press the pressing unit 41 can be avoided.

Figures 4A, 4B:
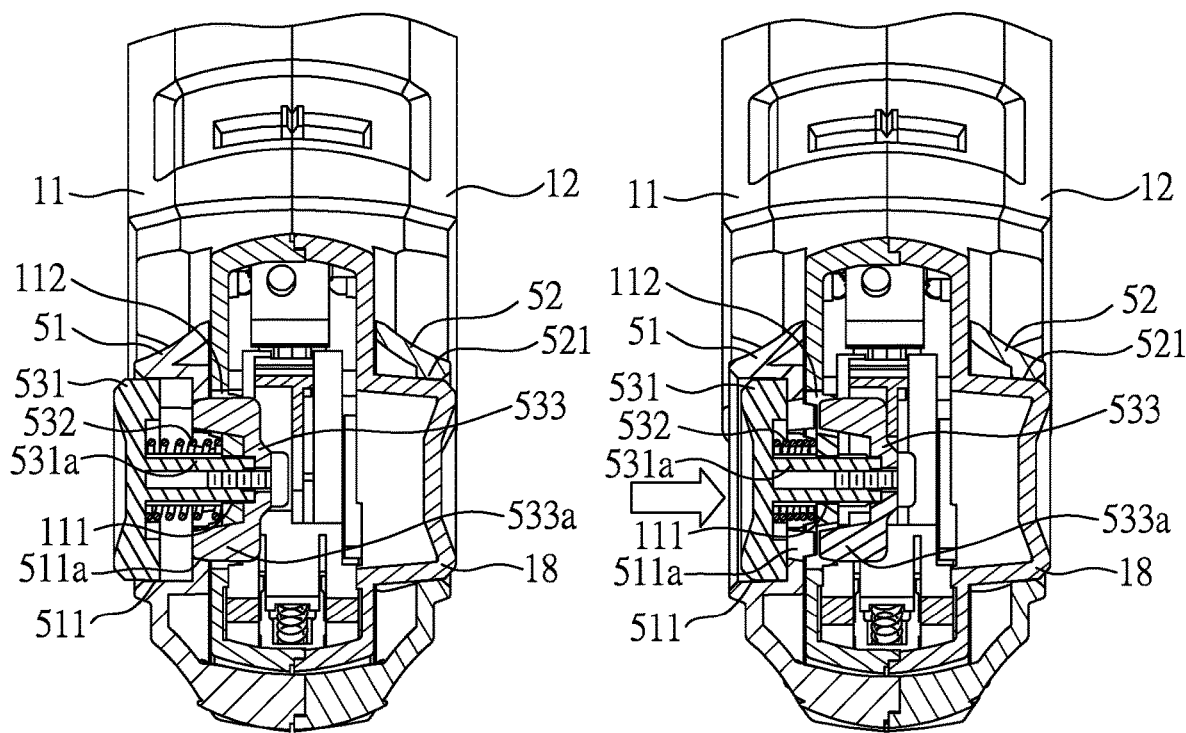
FIG. 4a is a cross sectional view illustrating the locking mechanism of the gas combustor being in a locked status according to the first embodiment of the present invention.
FIG. 4b is a cross sectional view illustrating the locking mechanism of the gas combustor being in an unlocked status according to the first embodiment of the present invention.

The rotary housing 5 is composed of a left inner housing part 51 and a right inner housing part 52 being engaged with each other, so that a bottom end of the rotary housing 5 is pivoted with the fixed housing 1, and a top end thereof is connected to the combusting device 6. A first shaft hole 511 and a second shaft hole 521 are oppositely formed at two sides of the rotary housing 5, the second shaft hole 521 is served to allow a pivotal shaft 18, correspondingly formed at the top end of the fixed housing 1, to be sleeved, and the first hole 511 has a plurality of annularly-arranged teeth slots 511a for receiving a locking mechanism 53 having an unlocking press button 531, a connection rod 531a extrudes from an inner surface of the unlocking press button 531 to pass the first shaft hole 511, be sleeved with a stretch spring 532 and enter the rod hole 531a, the connection rod 531a is connected to a passive member 533 in the fixed housing 1, the passive member 533 has at least one convex tooth 533a protruding toward the at least one insertion hole 112, and each of the at least one convex tooth 533a is to be inserted and positioned in one of the teeth slots 511a, thereby forming a locked status (as shown in FIG. 1 and FIG. 4a). As such, the rotary housing 5 is unable to be rotated relative to the fixed housing 1, thereby forming an effect of fastening a combusting angle of the combusting device 6.

Figure 5:
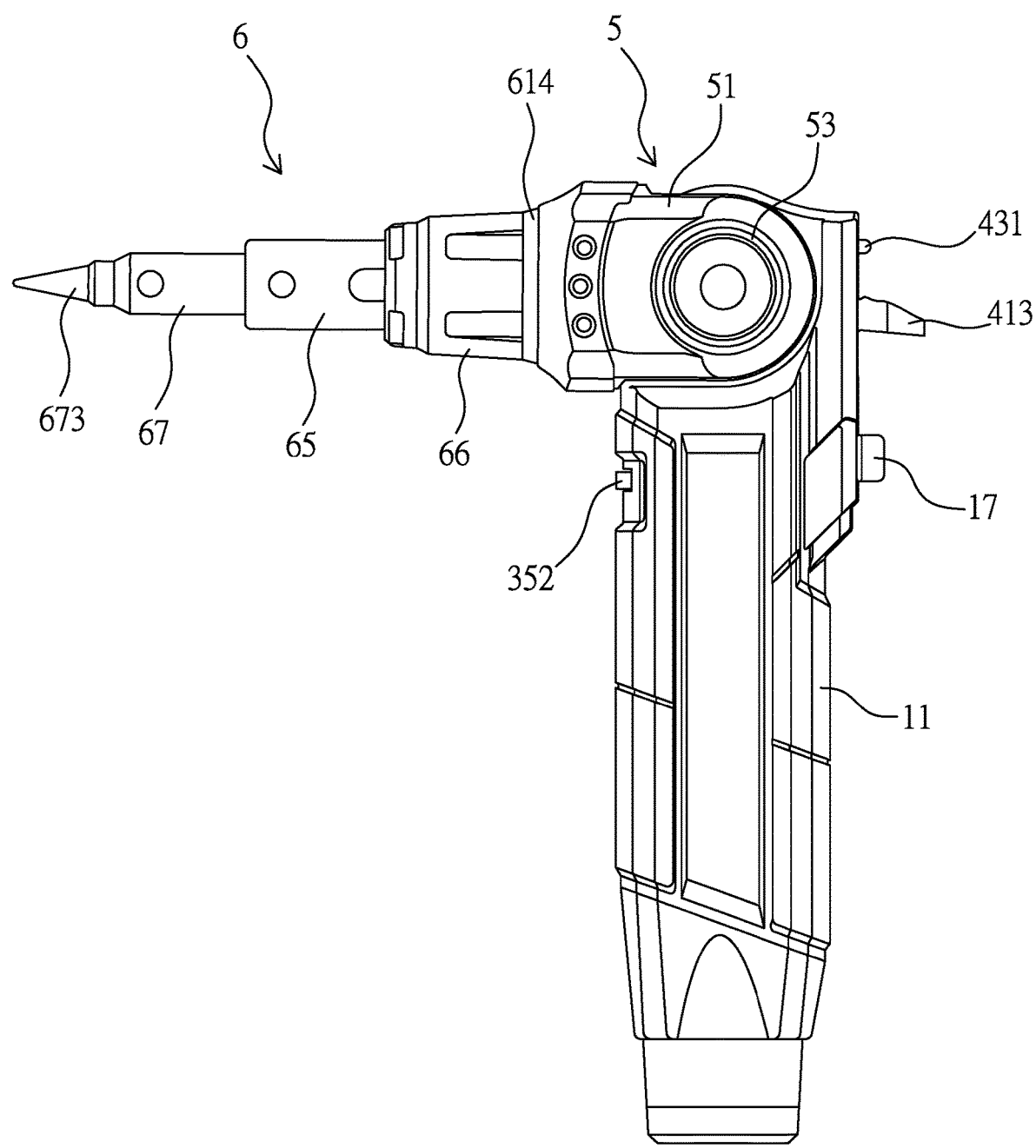
FIG. 5 is a side view illustrating the rotary housing and the combusting device of the gas combustor being rotated to an angle relative to the fixed housing according to the first embodiment of the present invention.
Figure 6:
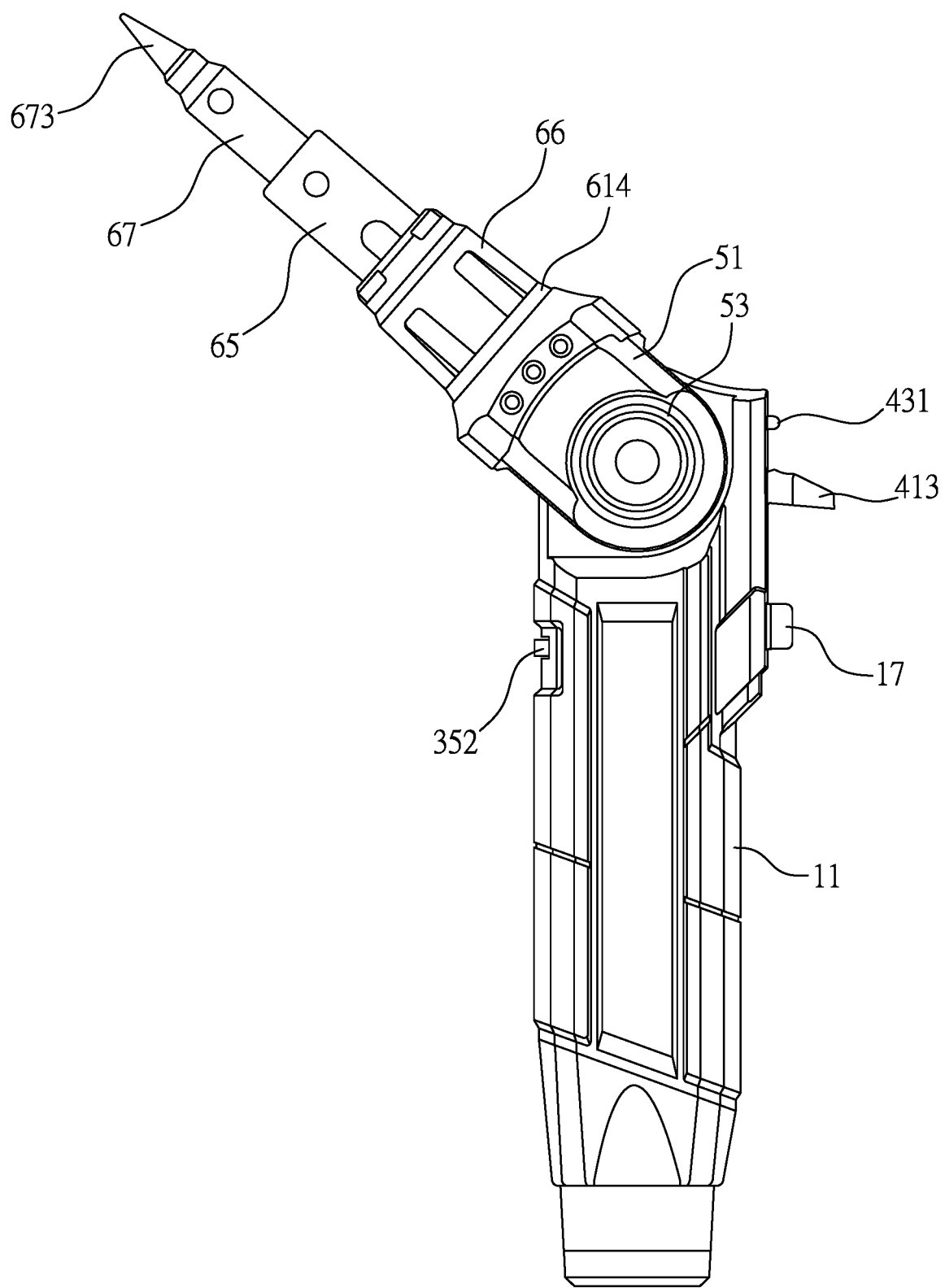
FIG. 6 is a side view illustrating the rotary housing and the combusting device of the gas combustor being rotated to another angle relative to the fixed housing according to the first embodiment of the present invention.

If the combusting angle of the combusting device 6 is desired to be adjusted, the user only has to press the unlocking press button 531 to compress the stretch spring 532, so that the passive member 53 is inwardly displaced with the connection rod 531a, and each of the convex teeth 533a is released from the corresponding teeth slot 511a, thereby terminating the locked status (as shown in FIG. 4b). At this moment, under a situation of the locked status being terminated, the pivotal shaft 18 can be served as an axial core of the second shaft hole 521, and the unlocking press button 531 is served as an axial core of the first shaft hole 511, so that the rotary housing 5 having the combusting device 6 can be directly rotated till a desired combusting angle is provided; as shown in FIG. 5, the rotary housing 5 and the combusting device 6 are rotated 90 degrees relative to the fixed housing 1; or as shown in FIG. 6, the rotary housing 5 and the combusting device 6 are rotated 135 degrees relative to the fixed housing 1.

When the combusting angle is adjusted to the desired combusting angle, the user can release the unlocking press button 531, so that the unlocking press button 531 is able to be recovered to an initial non-pressed location via an energy releasing effect provided by the stretch spring 532, the passive member 533 is able to be outwardly displaced with the connection rod 531a, and each of the convex teeth 533a can be received in the corresponding teeth slot 511a, thereby forming a locked status (as shown in FIG. 4a), and a fastening effect can be provided to the gas combustor having the desired combusting angle.

For preventing the unlocking press button 531 from rotating and preventing the at least one convex teeth 533a from being unable to be inserted again after being released from the at least one insertion hole 112, an outer circumference of the connection rod 531a is transversally protruded with at least one convex tenon 531b, and the rod hole 111 is formed with a tenon slot 111a arranged at a location corresponding to each of the convex tenons 531b, communicating with the rod hole 111 and allowing each of the convex tenons 531b to be received, thus a blocking effect can be provided by each of the convex tenons 531b and the tenon slot 111a for preventing the unlocking press button 531 from rotating. According to another embodiment, the at least one tenon slot is formed on the connection rod 531a, and the at least one convex tenon is formed in the rod hole 111, thus the same effect of preventing the unlocking press button 531 from rotating can also be provided.

Figure 9:
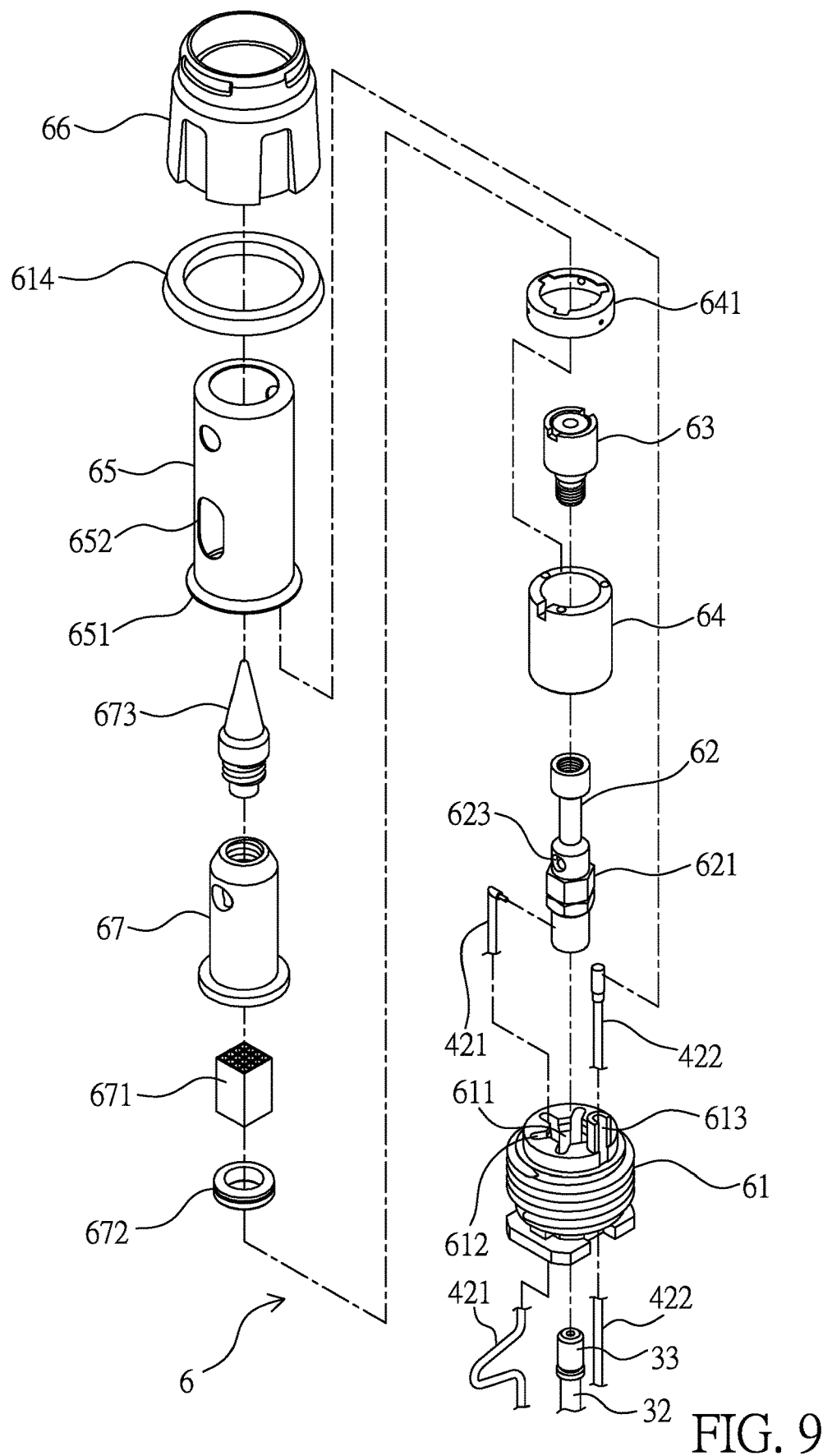
FIG. 9 is a perspective exploded view illustrating the combusting device of the gas combustor according to the first embodiment of the present invention.
Figure 10:
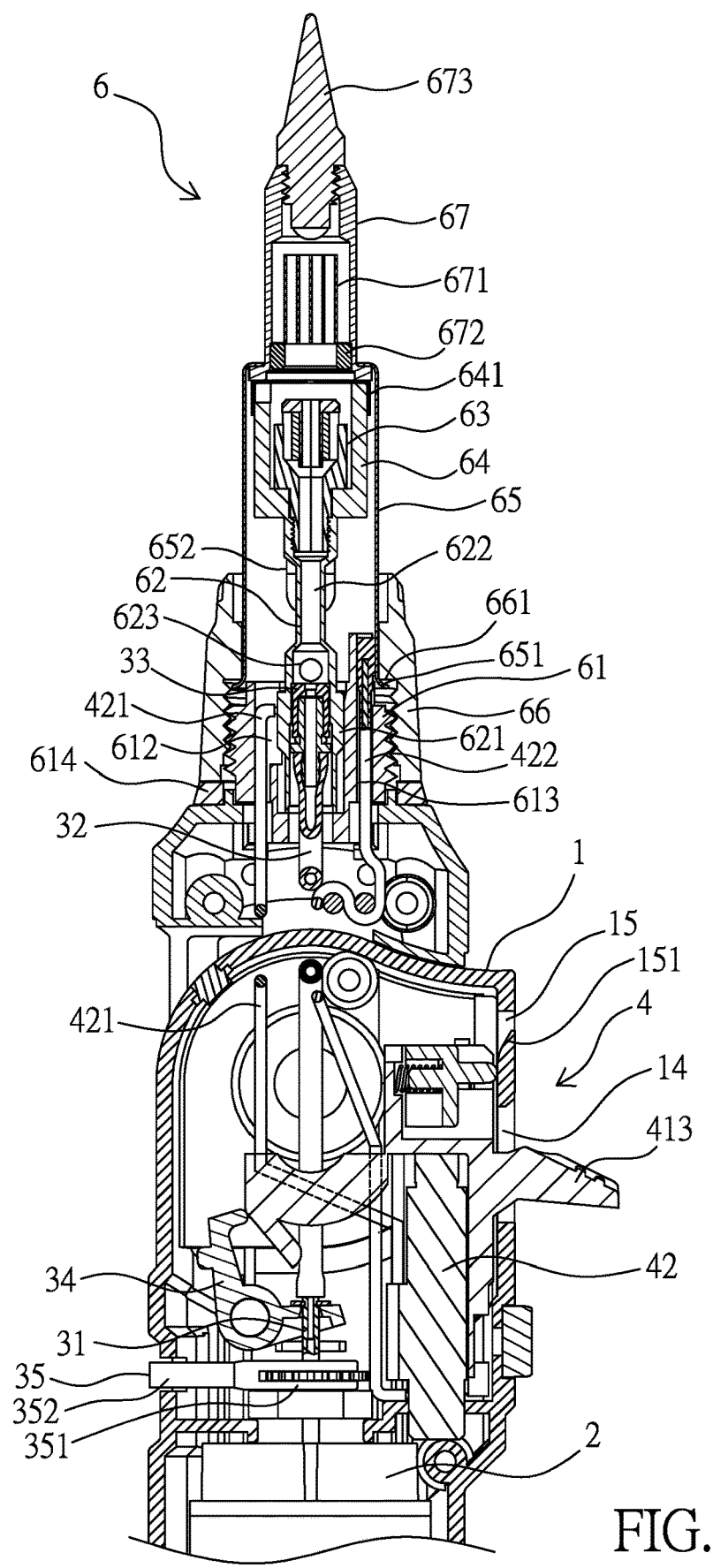
FIG. 10 is a cross sectional view illustrating the combusting device of the gas combustor according to the first embodiment of the present invention.
Figure 11:
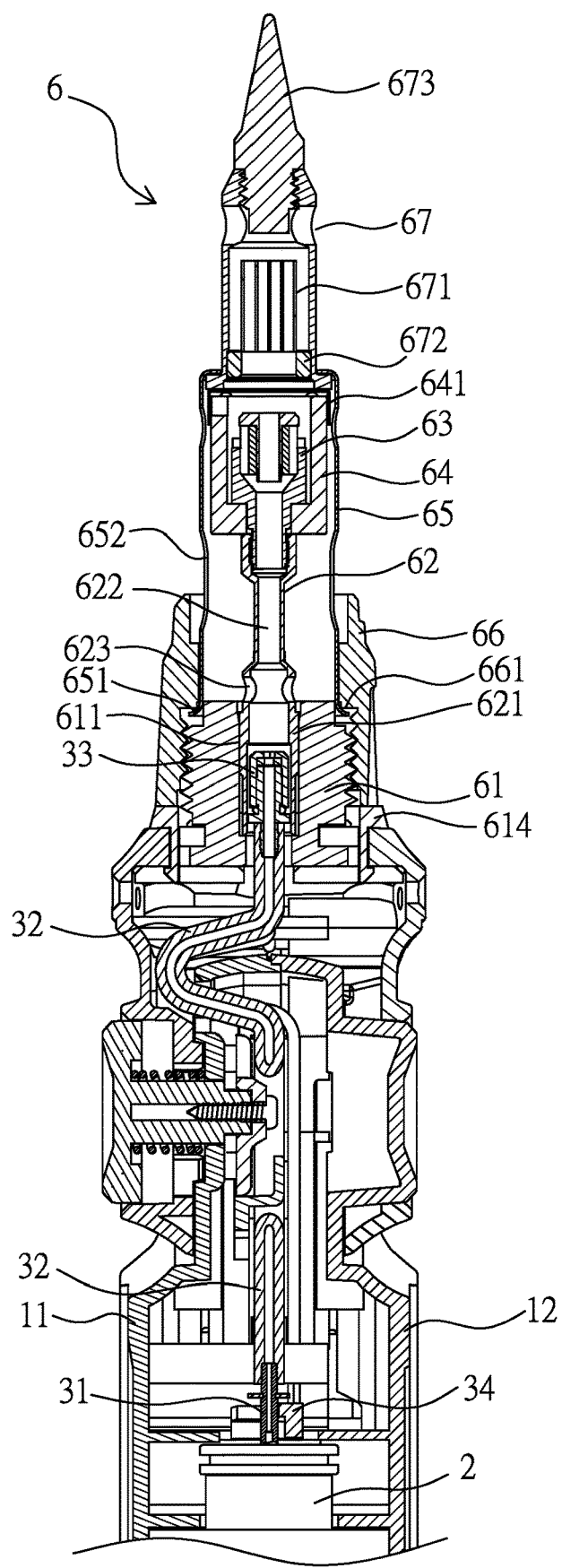
FIG. 11 is another cross sectional view illustrating the combusting device of the gas combustor according to the first embodiment of the present invention.

Please refer from FIG. 9 to FIG. 11, the combusting device 6 has a base 61 connected to the rotary housing 5, a polygonal positioning hole 611 longitudinally formed on the base 61 and allowing a mixing pipe 62 to be received, a circumference of the positioning hole 611 is radially extended with a plurality of wire slots 612 allowing the conductive wire 421 to pass and longitudinally protruded with a pipe slot 613 allowing the return wire 422 to be positioned, an outer circumference of the mixing pipe 62 is formed with a polygonal insertion segment 621 inserted in the positioning hole 611 and incapable of rotating, and the gas ejecting nozzle 33 is disposed at an upstream end defined inside the mixing pipe 62, and the flame nozzle 63 is disposed at a downstream end of the mixing pipe 62 after being sleeved in a heat insulating sleeve 64, thus a mixing chamber 622 is formed between the upstream end and the downstream end, and the mixing chamber 622 is formed with at least one air inlet hole 623 arranged at a downstream end of the gas ejecting nozzle 33.

Accordingly, after the fuel gas is ejected from the gas ejecting nozzle 33, air can be driven to be introduced from the at least one air inlet hole 623, then the fuel gas and the air are allowed to enter the mixing chamber 622 for being mixed so as to form a mixed fuel gas, the mixed fuel gas is ejected from the flame nozzle 63 of the mixing chamber 622, and the heat insulating sleeve 64 is served to enclose the flame nozzle 63, so that the combusting flame can be ensured to be ejected from an opened end of the heat insulating sleeve 64. The opened end of the heat insulating sleeve 64 is disposed with a conductive ring 641 spaced from the flame nozzle 63 with an interval, so that the spark can be generated between the conductive ring 641 and the flame nozzle 63, thereby enabling the mixed fuel gas ejected from the flame nozzle 63 to be ignited, so as to be formed as the gas combustor.

The combusting device 6 further has an outer pipe 65, a bottom end of the outer pipe 65 is formed with a flange 651 arranged at a top end of the base 61, and a locking ring 66 is locked on the base 61, thus an inner block edge 661 formed in a stepped outline and disposed inside the locking ring 66 is able to press the flange 651, and the outer pipe 65 is able to be fastened on the base 61 and served to cover the mixing pipe 62, the flame nozzle 63 and the heat insulating sleeve 64.

A decorative ring 614 is further provided on an outer circumference of the base 61, and the decorative ring 614 is pressed by the locking ring 66 and clamped between the base 61 and the locking ring 66.

Moreover, at least one ventilation hole 652 is further formed on the outer circumference of the outer pipe 65, so that external air can be introduced from the ventilation hole 652, and allowed to enter the mixing chamber 622 through the air inlet hole 623 so as to be mixed with the fuel gas to form the mixed fuel gas.

Furthermore, one free end of the outer pipe 65 is further connected to an inner pipe 67, so that the combusting flame can be prevented from being exposed, in other words being formed as a thermal baking device, an inner burning member 671, for example a coiled platinum catalyst or a hive-like ceramic grid, is disposed in the inner pipe 67, and a block ring 672 is provided, thereby preventing the inner burning member 671 from being released from the inner pipe 67, thus the inner burning member 67 can be continuously kept in an inner burning status. Moreover, one free end of the inner pipe 67 is connected to a ferrochromium head 673, and the ferrochromium head 673 can be used as a soldering device with a heat conducting effect provided by the inner burning member 671.

The conductive wire 421 of the piezoelectric device 42 is in contact with the mixing pipe 62 in the wire slot 612 where the conductive wire 421 is received, so that the current is able to pass the mixing pipe 62 and the flame nozzle 63, and the spark can be generated between the flame nozzle 63 and the conductive ring 641, so that after the fuel gas ejected from the flame nozzle 63 is ignited, the current can travel along the inner pipe 67 and the outer pipe 65 then be transferred back to the piezoelectric device 42 via the return wire 422 disposed in the wire slot 613 and in contact with the outer pipe 65, thereby forming the electric circulating loop.

Please refer to FIG. 1, FIG. 5 and FIG. 6, when the combusting angle is desired to be adjusted, the user only has to press the locking mechanism 53 to terminate the locked status formed between the rotary housing 5 and the fixed housing 1. Under a situation of the locked status being terminated, the rotary housing 5 having the combusting device 6 can be directly rotated till the desired combusting angle is provided; as shown in FIG. 5, the rotary housing 5 and the combusting device 6 are rotated 90 degrees relative to the fixed housing 1; as shown in FIG. 6, the rotary housing 5 and the combusting device 6 are rotated 135 degrees relative to the fixed housing 1; or as shown in FIG. 1, the rotary housing 5 and the combusting device 6 are rotated 180 degrees relative to the fixed housing 1.

Please refer from FIG. 12 to FIG. 20, wherein the second embodiment of the present invention discloses a gas combustor. According to this embodiment, the gas combustor includes a fixed housing 1, a gas storage cylinder 2, a gas discharging device 3, an igniting device 4, a rotary housing 5 and a combusting device 6.

Figure 12:
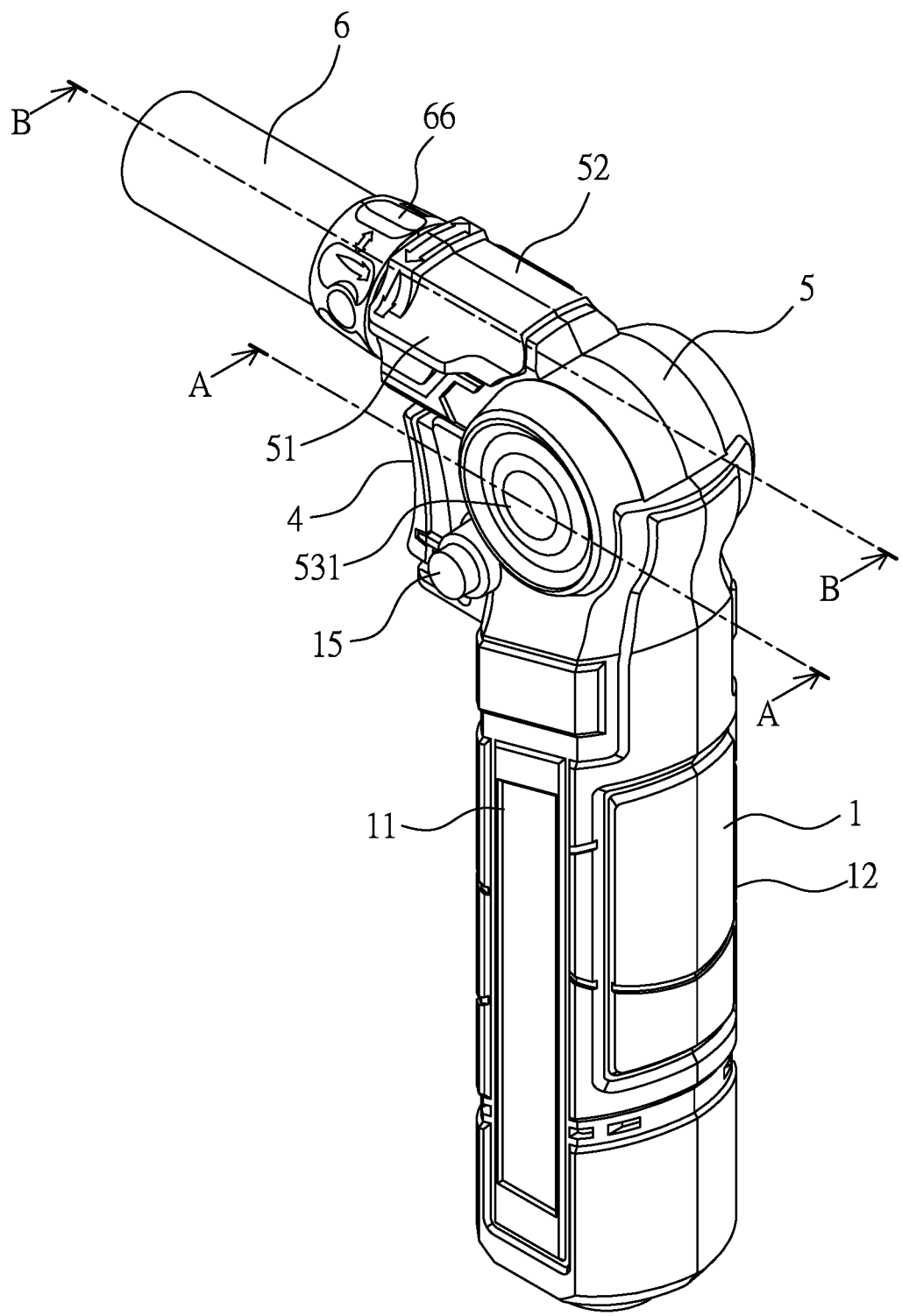
FIG. 12 is a perspective view illustrating the gas combustor according to the second embodiment of the present invention.
Figure 13:
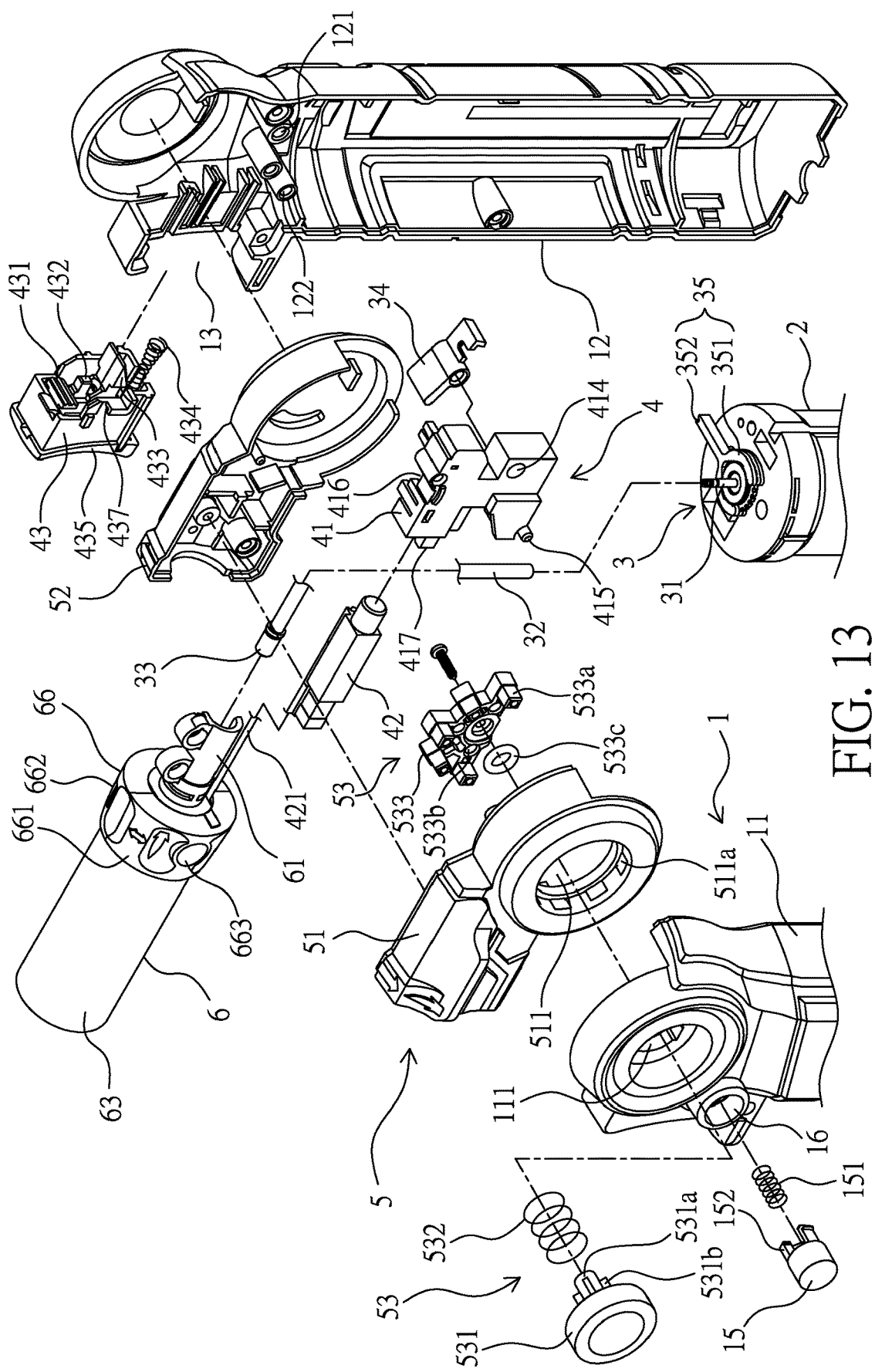
FIG. 13 is a perspective exploded view illustrating the gas combustor according to the second embodiment of the present invention.
Figure 14:
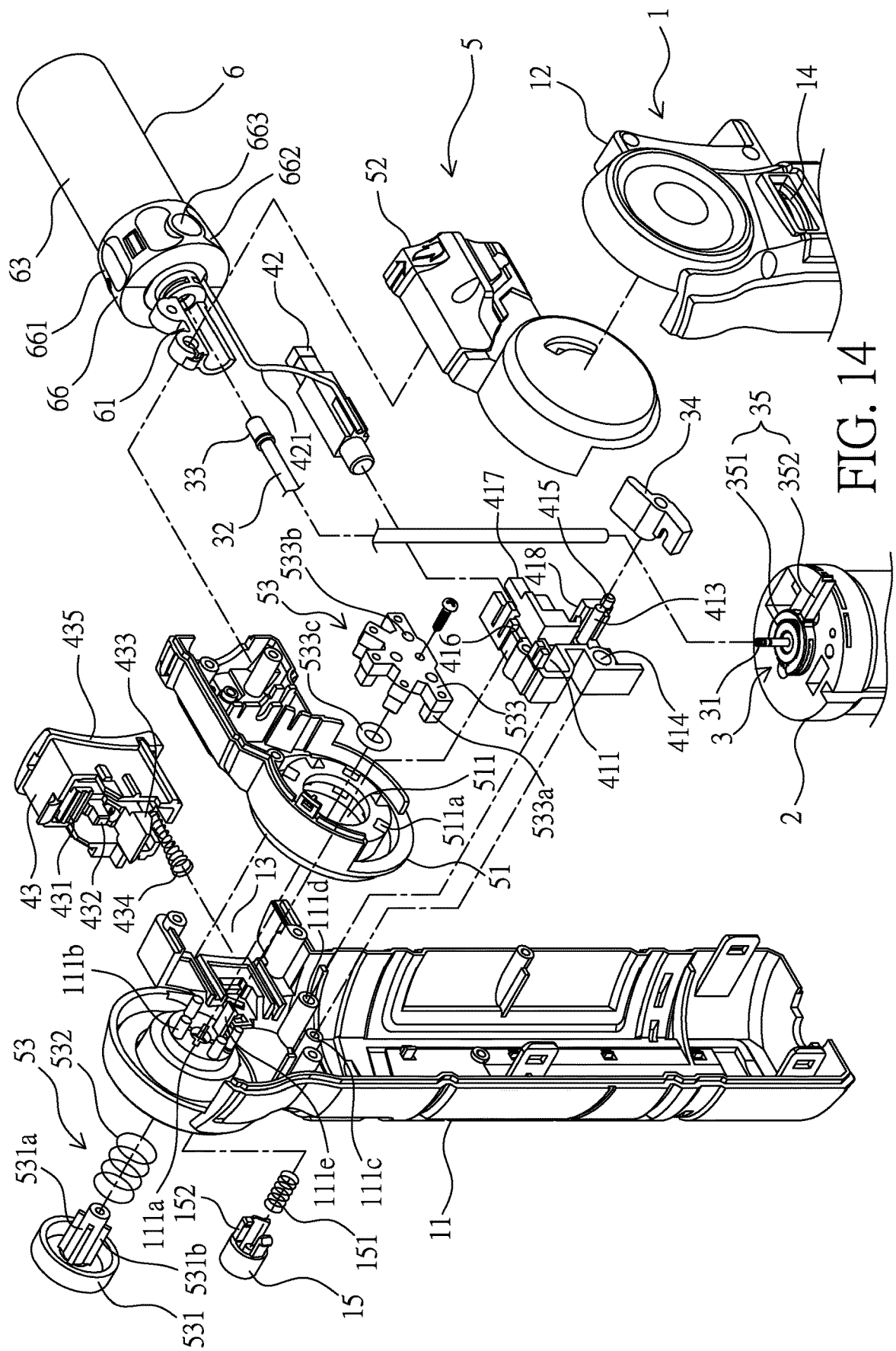
FIG. 14 is another perspective exploded view illustrating the gas combustor according to the second embodiment of the present invention.

The fixed housing 1 is utilized for being held by a hand of a user; as shown from FIG. 12 to FIG. 14, the fixed housing 1 is composed of a left housing part 11 and a right housing part 12 being engaged with each other. At least one connection member, for example a screw, is utilized for passing the right housing part 12 and locked on the left housing part 11. The gas storage cylinder 2 is disposed in the fixed housing 1, the gas storage cylinder 2 is utilized for storing liquid gas, and a bottom end thereof is disposed with a conventional gas filling nozzle (known as prior art, therefore not provided with a code) used for allowing the liquid gas (gas fuel) to be replenished. The gas discharging device 3 is disposed at a top end of the gas storage cylinder 2.

Moreover, a top end of one of the left housing part 11 and the right housing part 12, for example the left housing part 11, is transversally formed with a rod hole 111 (as shown in FIG. 13).

The gas discharging device 3 has a gas discharging valve 31 disposed at a top end of the gas storage cylinder 2, a gas conveying soft pipe 32 having a upstream end thereof sleeved with the gas discharging valve 31, a gas ejecting nozzle 33 disposed at a downstream end of the gas conveying soft pipe 32, and a gas discharging press plate 34 having one end thereof sleeved with the gas discharging valve 31. When another end of the gas discharging press plate 34 is pressed, a leverage effect is generated by the gas discharging press plate 34 for allowing the gas discharging valve 31 to be lifted so as form an opened status, and the liquid gas in the gas storage cylinder 2 is vaporized so as to enter the gas conveying soft pipe 32 from the gas discharging valve 31 and rapidly ejected from the gas ejecting nozzle 33 for entering the combusting device 6.

The gas discharging device 3 further has a regulation unit 35. The regulation unit 35 has a sleeve ring 351 radially sleeved with the gas discharging valve 31, and a regulation rod 352 laterally extended from the sleeve ring 351. The regulation rod 352 is able to protrude from the fixed housing 1. As such, when the regulation rod 352 is pulled, the gas discharging valve 31 is able to be rotated with the sleeve ring 351, so that a gas discharge amount of the fuel gas can be regulated.

The igniting device 4 has a fastening rack 41, a piezoelectric device 42 and a safety switch 43. The fastening rack 41 is disposed on a top surface of the gas storage cylinder 2, an accommodation slot 411 allowing the piezoelectric device 42 to be accommodated and positioned is formed at a top end of the fastening rack 41, and one free end of a conductive wire 421 of the piezoelectric device 42 is extended into the combusting device 6.

Moreover, the fastening rack 41 further has a support arm 413 protruded for allowing the gas discharging press plate 34 to be pivoted and inserted in a housing part, for example the right housing part 12; and a penetrated hole 414 allowing a positioning rod 111c protruded from an inner wall of a housing part, for example the left housing part 11, to be received, and the positioning rod 111c is inserted in a positioning hole 121 correspondingly formed on an inner wall of the another housing part, for example the right housing part 12. Moreover, two sides of the fastening rack 41 are respectively protruded with at least one latch tenon 415, the latch tenons 415 are respectively inserted in tenon holes 111d, 122 correspondingly formed on the inner walls of the left housing part 11 and the right housing part 12, so that the fastening rack 41 can be firmly positioned in the fixed housing 1.

Moreover, an inner circumference of the rod hole 111 is provided with at least one latch hook 111e, each of the latch hooks 111e is able to latch a latch slot 416 correspondingly formed on the fastening rack 41, thereby enhancing the stability of the fastening rack 41.

A front end and a top end of the fixed housing 1 are respectively formed with an opened slot 13 allowing the combusting device 6 and the rotary housing 5 to rotate. A front bottom side of the opened slot 13 is connected to the button-like safety switch 43 which has been disclosed in Taiwan Patent No. 1641783 (corresponding to China Paten Application No. 201710573119.1 and U.S. patent application Ser. No. 15/356,568) thus not provided with further illustrations in this embodiment. A back side of the safety switch 43 has a press block 431 capable of pressing the piezoelectric device 4, a lock bolt 432 capable of transversally sliding and abutting against of a stop block 417 preformed on the fastening rack 41 while being in a non-sliding status, a pressing plate 433 allowing the gas discharging press plate 34 to generate a leverage effect, and an auxiliary spring 434 capable of abutting against a stop wall 418 of the fastening rack 41.

When the safety switch 43 is not in an operating status, the lock bolt 432 abuts against the stop block 417 for forming a locking and non-pressing status. The lock bolt 432 is able to transversally displace with a slide member 435 disposed at a front end of the safety switch 43, so that the lock bolt 432 can be released from the stop block 417 for forming an unlocking and pressing status.

Figure 15A:
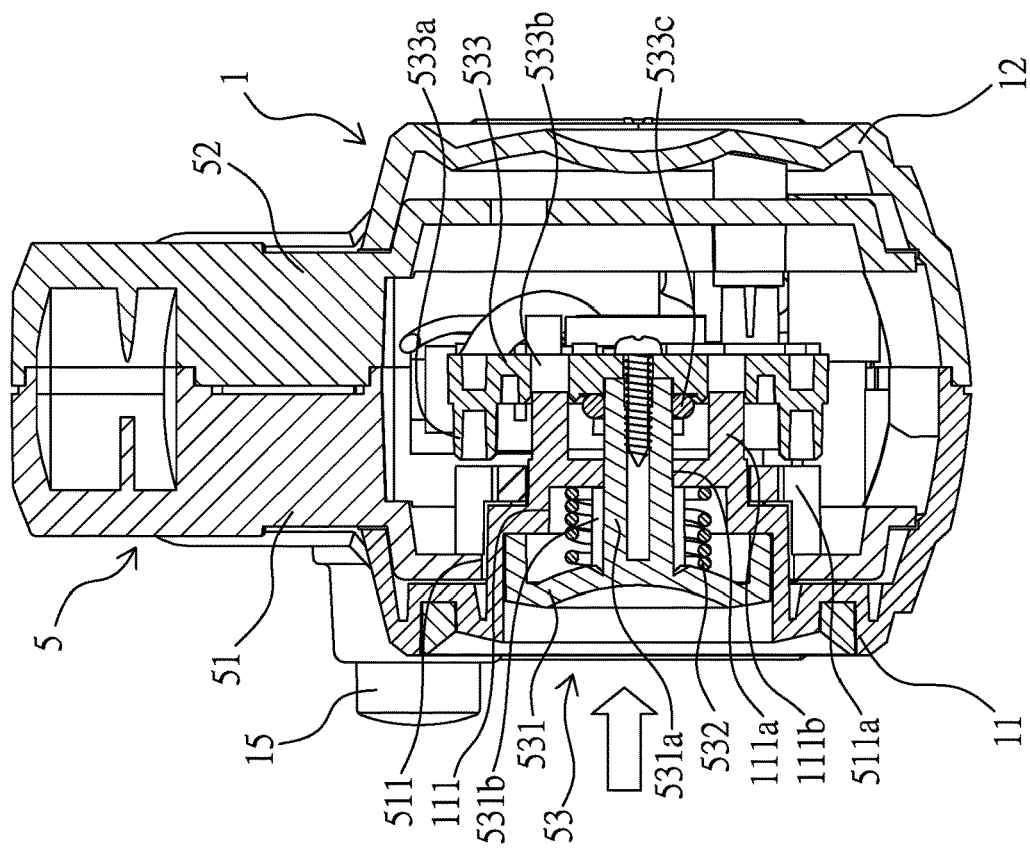
FIG. 15a is a cross sectional view illustrating the locking mechanism of the gas combustor being in a locked status according to the second embodiment of the present invention.

As shown from FIG. 13 to FIG. 15b, the rotary housing 5 is pivoted with the fixed housing 1, and composed of a left inner housing part 51 and a right inner housing part 52 being engaged with each other Wherein, one side (for example the left inner housing part 51) of the rotary housing 5 is formed with a shaft hole 511 having a plurality of annularly-arranged teeth slots 511a for receiving a locking mechanism 53 having an unlocking press button 531, a connection rod 531a extrudes from an inner surface of the unlocking press button 531 to pass the first shaft hole 511, be sleeved with a stretch spring 532 and enter the rod hole 511, the connection rod 531a is connected to a passive member 533 in the fixed housing 1, the passive member 533 has at least one convex tooth 533a protruding toward towards the plurality teeth slots 511a, and each of the convex tooth 533a is to be inserted and positioned in one of the teeth slots 511a, thereby forming a locked status (as shown in FIG. 15a).

Figure 15B:
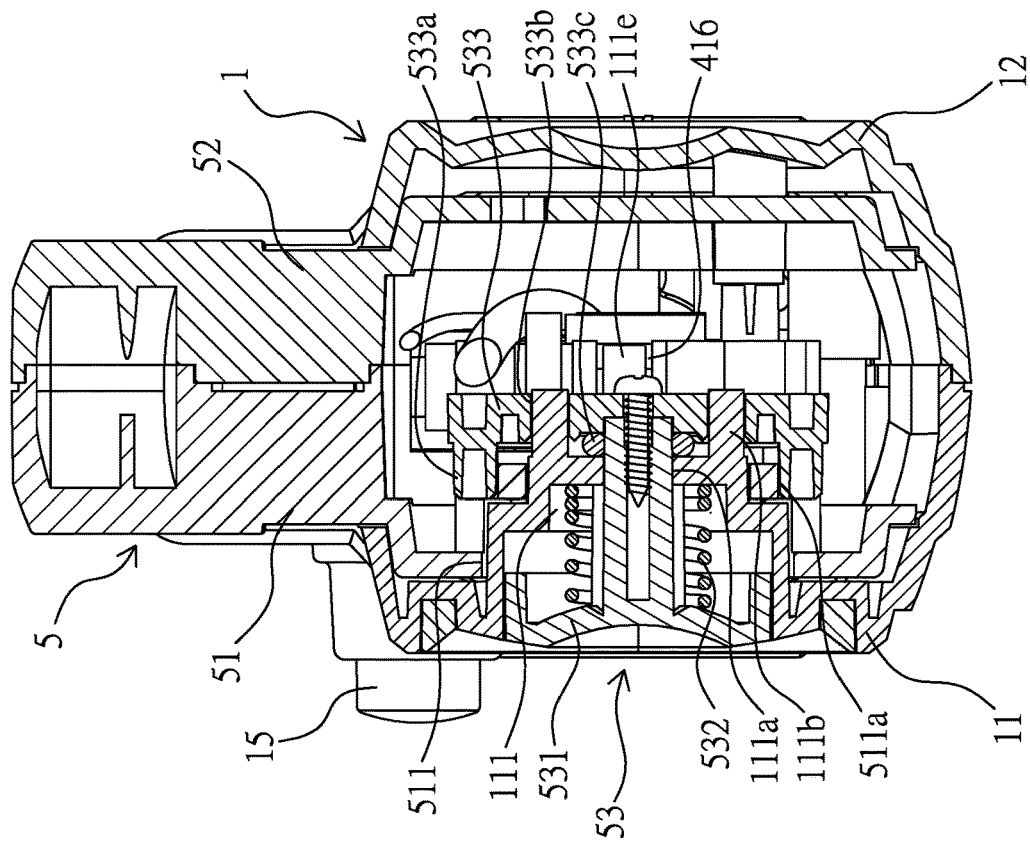
FIG. 15b is a cross sectional view illustrating the locking mechanism of the gas combustor being in an unlocked status according to the second embodiment of the present invention.
Figure 16:
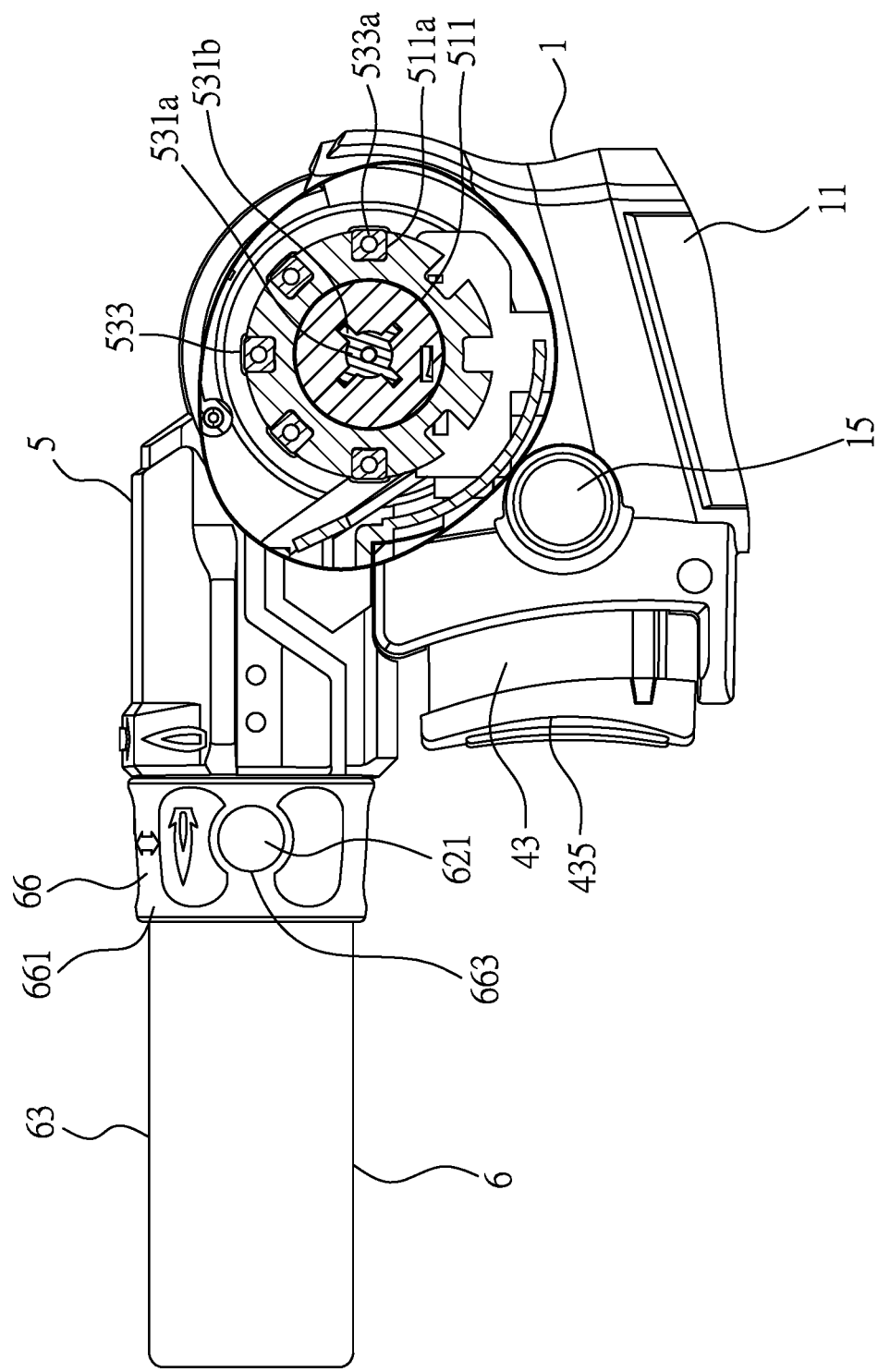
FIG. 16 is a partial cross sectional view of FIG. 12 taken along an A-A line.
Figure 18:
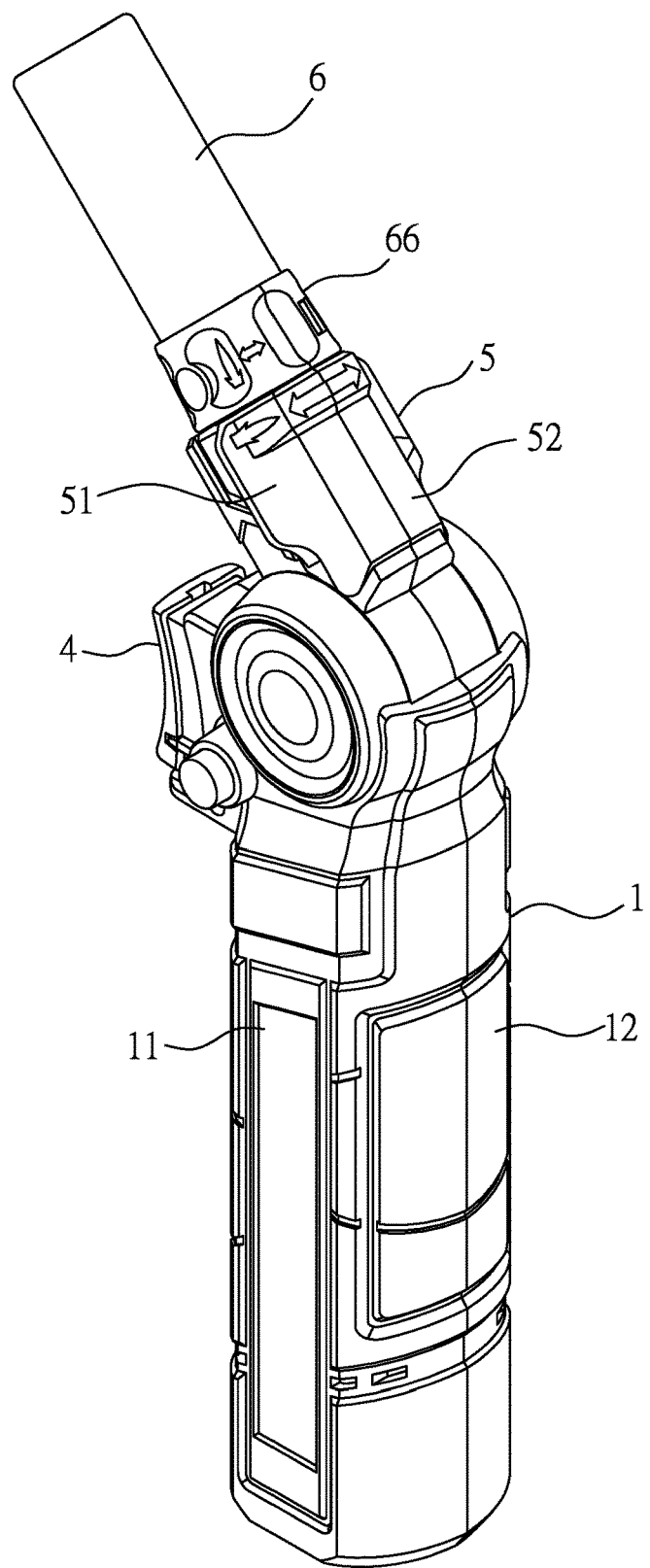
FIG. 18 is a perspective view illustrating the rotary housing and the combusting device of the gas combustor being rotated to another angle relative to the fixed housing according to the second embodiment of the present invention.
Figure 19:
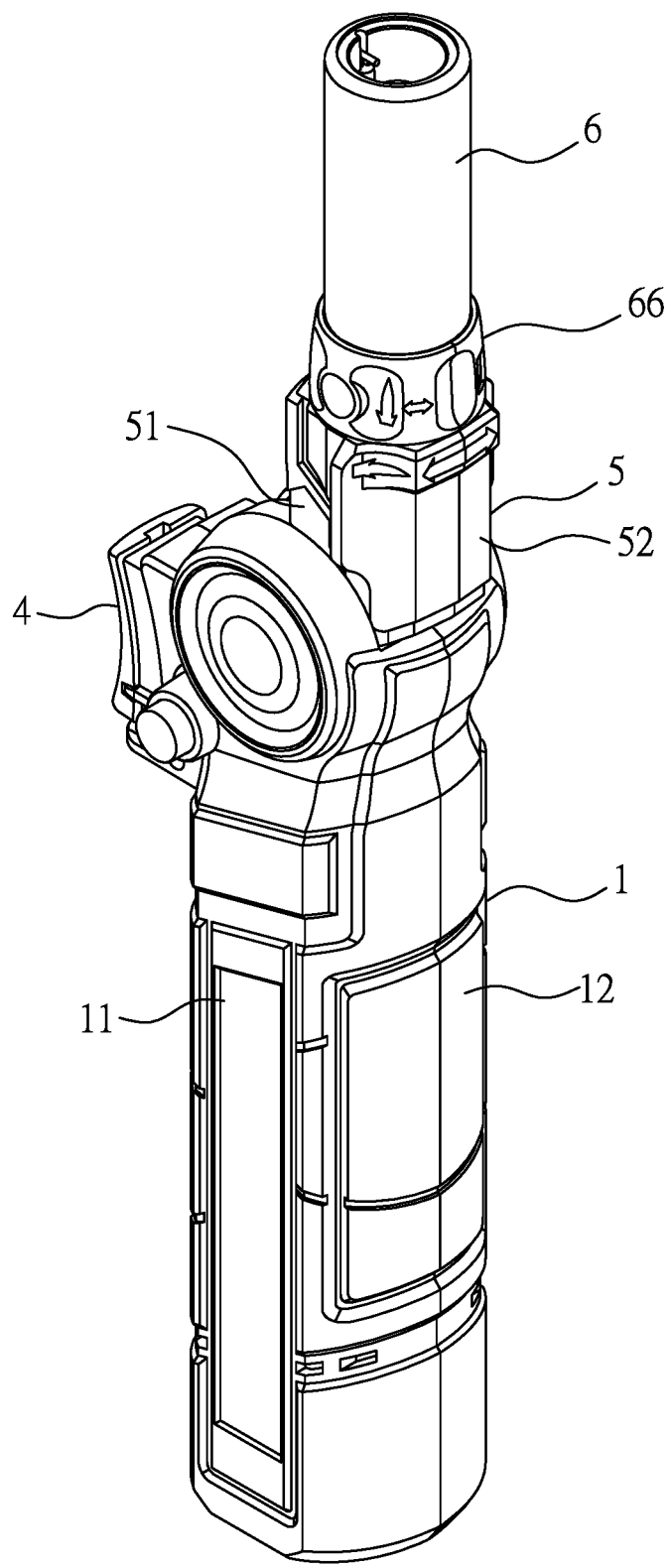
FIG. 19 is a perspective view illustrating the rotary housing and the combusting device of the gas combustor being rotated to still another angle relative to the fixed housing according to the second embodiment of the present invention.

When the unlocking press button 531 is pressed, the stretch spring 532 is compressed, so that each of the convex teeth 533a can be released from the corresponding teeth slot 511a, thereby determination the locked status (as shown in FIG. 15b), and the rotary housing 5 is able to rotate relative to the fixed housing 1, so as to be adjusted to a desired combusting angle; as shown in as shown in FIG. 16, the rotary housing 5 and the combusting device 6 are rotated 90 degrees relative to the fixed housing 1; as shown in FIG. 18, the rotary housing 5 and the combusting device 6 are rotated 135 degrees relative to the fixed housing 1; or as shown in FIG. 19, the rotary housing 5 and the combusting device 6 are rotated 180 degrees relative to the fixed housing 1.

For preventing the unlocking press button 531 from rotating, an outer circumference of the connection rod 531*a* is transversally protruded with at least one convex tenon 531*b*, and the rod hole 111 is formed with a tenon slot 111*a* arranged at a location corresponding to each of the convex tenons 531*b*, communicating with the rod hole 111 and allowing each of the convex tenons 531*b* to be received, thus a blocking effect can be provided by each of the convex tenons 531*b* and the corresponding tenon slot 111*a* for preventing the unlocking press button 531 from rotating. According to another embodiment, the at least one tenon slot is formed on the connection rod 531*a*, and the at least one convex tenon is formed in the rod hole 111, thus the same effect of preventing the unlocking press button 531 from rotating can also be provided.

For providing the stability during a process of the passive member 533 being displaced with the connection rod 531*a*, an inner circumference of the rod hole 111 is protruded with at least one slide tenon 111*b*, the passive member 533 is formed with a slide slot 533*b* arranged at a location defined on adjacent surfaces corresponding to each of the slide tenons 111*b* and allowing each of the slide tenons 111*b* to be received. As such, when the unlocking press button 531 is pressed and during a process of the connection rod 531*a* pushing the passive member 533 to displace, each of the slide slots 533*b* is able to slide along the corresponding slide tenon 111*b*, so that the passive member 533 can be prevented from shaking as so to enhance the stability in displacements. According to another embodiment, the at least one slide slot is formed in an inner circumference of the rod hole 111, and the at least one slide tenon is disposed on a corresponding adjacent surface of the passive member 53, and the same effect of preventing the passive member 53 from shaking can also be provided.

Moreover, the connection rod 531*a* is sleeved with a buffering pad 533*c*, and the buffering pad 533*c* is arranged to be adjacent to the passive member 53. When the rotary housing 5 and the combusting device 6 are rotated to a desired angle relative to fixed housing 1, the user can release the unlocking press button 531 to allow the stretch spring 532 to stretch, so that the passive member 53 is able to be outwardly displaced with the connection rod 531*a*, and each of the convex teeth 533*a* is inserted and positioned in the corresponding teeth slot 511*a*, thereby forming the locked status (as shown in FIG. 15*a*). During the locking process, the buffering pad 533*c* is in contact with a wall surface defined at the circumference of the rod hole 111 so as to absorb noises generated while components colliding with each other.

Please refer to FIG. 13, FIG. 14, FIG. 16 and FIG. 17, the combusting device 6 has a support arm 61 connected to and disposed in the rotary housing 5, a middle portion of the support arm 61 is forming with a connection part 62 capable of being connected with an outer pipe 63, one side of the connection part 62 is formed with at least one air inlet hole 621, and the at least one air inlet hole 621 is communicated with a mixing chamber 622 inside the support arm 61, the gas ejecting nozzle 33 is inserted at an upstream end of the mixing chamber 622 and arranged to be adjacent to the at least one air inlet hole 621; as such, after the fuel gas is ejected from the gas ejecting nozzle 33, air can be driven to be introduced from the at least one air inlet hole 621, then the fuel gas and the air are allowed to enter the mixing chamber 622 for being mixed so as to form a mixed fuel gas, the mixed fuel gas is ejected from a flame nozzle 64 connected to a downstream end of the mixing chamber 622, and the outer pipe 63 is served to enclose the flame nozzle 64, so that the combusting flame can be ejected from an opened end of the outer pipe 63.

Moreover, the flame nozzle 64 is disposed in a heat insulating member 65 made of a ceramic material, the heat insulation member 65 is disposed in the outer pipe 63, one end of the heat insulating member 65 is abutted against an inward-retracting edge 631 at the opened end of the outer pipe 63, an elastic unit 612, for example a spring, is disposed between anther end of the heat insulating member 65 and a convex ring 611 of the support arm 61, thereby enabling the heat insulating member 65 to be positioned in the opened end of the outer pipe 63. The conductive wire 421 is allowed to pass the connection part 62, the outer pipe 63 and the heat insulating member 62, and the free end of the conductive wire 421 is spaced from the flame nozzle 64 with an interval, so that a generated static spark can be used for igniting the mixed fuel gas ejected from the flame nozzle 64

Moreover, an air adjusting ring 66 is disposed at an outer side of the at least one air inlet hole 621, the air adjusting ring 66 is composed of a half left ring 661 and a half right ring 622 being engaged with each other, and at least one ventilation hole 663 is formed on the air adjusting ring 66. Through rotating the air adjusting ring 66, a shielding range of the at least one ventilation hole 663 shielding the diameter of the at least one air inlet hole 621 can be adjusted for determining the amount of air entering the at least one air inlet hole 621, so as to adjust the flame.

Figure 17:
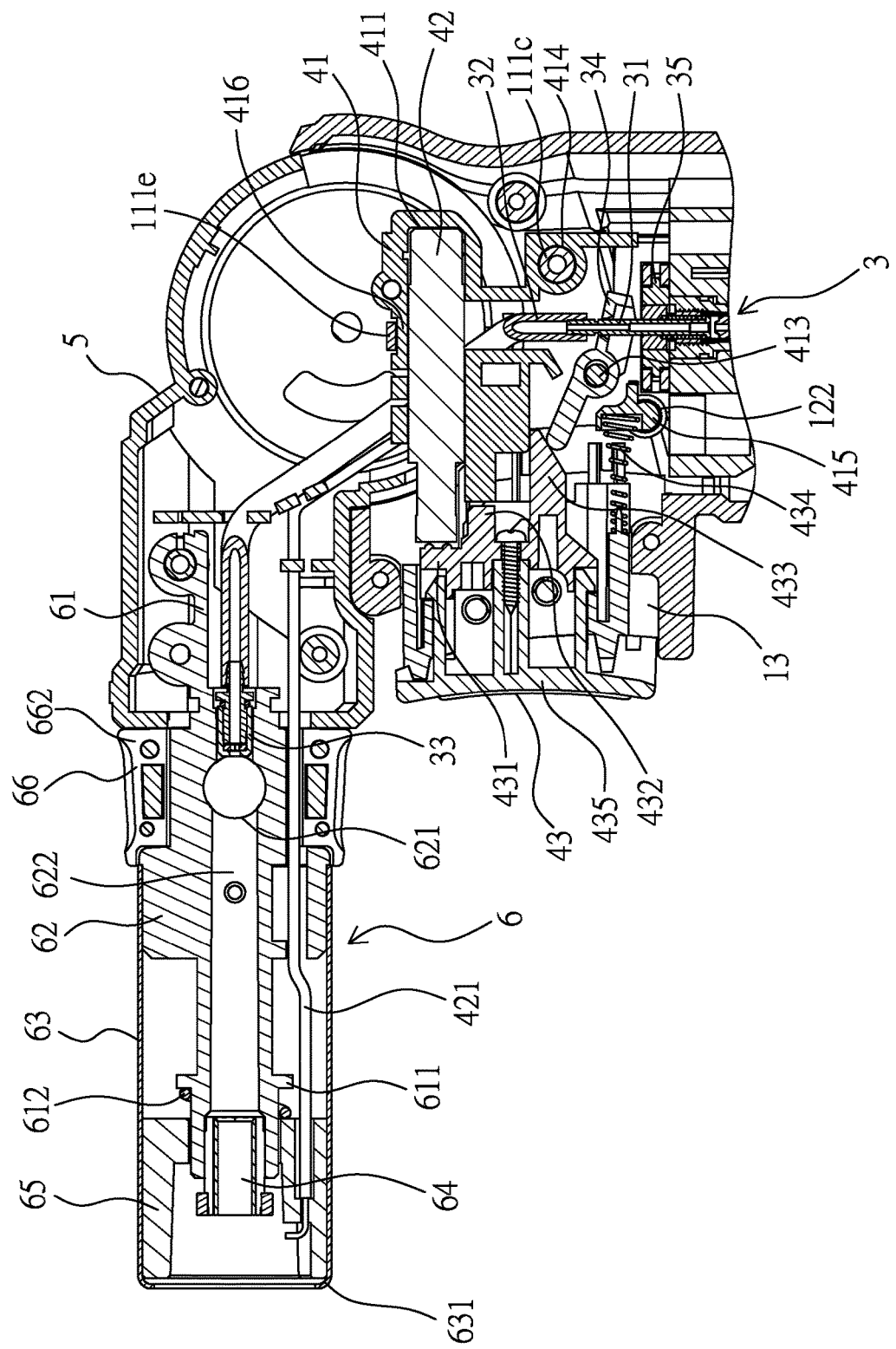
FIG. 17 is a partial cross sectional view of FIG. 12 taken along a B-B line.

As shown in FIG. 17, when the safety switch 43 is pressed by the finger of the user, the piezoelectric device 42 is synchronously pressed by the press block 431, so that the pressing plate 433 is able to press one end of the gas discharging press plate 34 during the displacement process, the gas discharging valve 3 is lifted by another end of the gas discharging press plate 34, and the fuel gas is allowed to pass the gas conveying soft pipe 32 and be ejected by the gas ejecting nozzle 33 so as to enter the mixing chamber 622 of the combusting device 6, and external air is introduced through the at least one ventilation hole 663 of the air adjusting ring 66 and the at least one air inlet hole 621 of the connection part 62 for entering the mixing chamber 622 so as to be mixed with the fuel gas to form the mixed fuel gas. The static electricity generated by the piezoelectric device is allowed to pass the conductive wire 421, and the static spark generated between the conductive wire 421 and the flame nozzle 64 and at the location of the heat insulating member 65 can be used for igniting the mixed fuel gas so as to perform a combusting operation.

Figure 20:
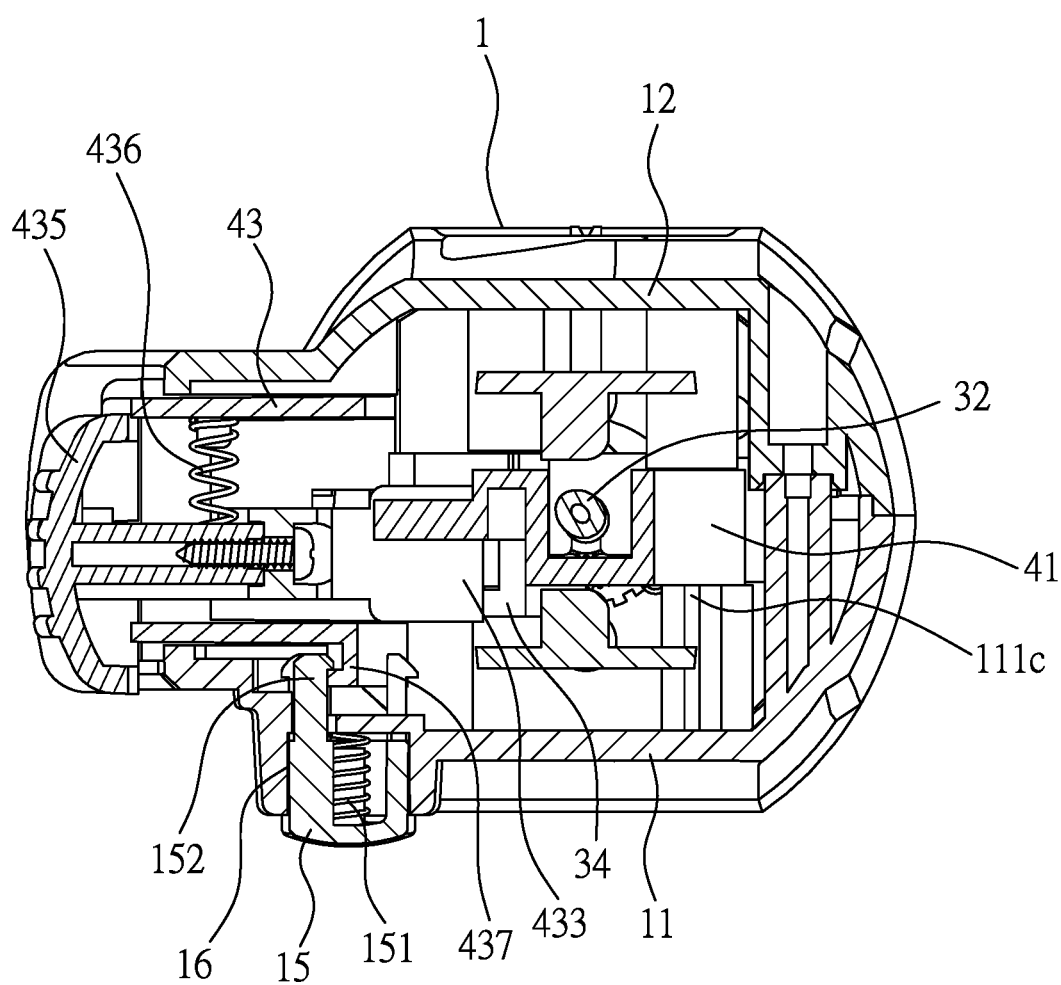
FIG. 20 is a cross sectional view illustrating the gas combustor being in a continuous combusting status according to the second embodiment of the present invention.

When the safety switch 43 is no longer pressed by the finger of the user, the safety switch 43 is able to return to an initial non-operated position through the piezoelectric device 42 and an energy releasing effect provided by the auxiliary spring 434, and the slide member 435 is able to return to an initial locked position though an energy releasing effect provided by an internal elastic unit 436 (as shown in FIG. 20), for example a spring, so that children can be protected from operating the gas combustor.

Moreover, the fixed housing 1 is formed with a housing slot 14 allowing the regulation rod 352 to be protruded at a location corresponding to the regulation rod 352, so that the air output amount of the gas discharging valve 31 can be regulated.

Please refer to FIG. 13, FIG. 14 and FIG. 20, the fixed housing 1 further has a continuous button 15. The continuous button 15 is disposed in a button hole 16 of the fixed housing 1, and a recovery spring 151 is disposed between the continuous button 15 and the button hole 16. A buckle hook 152 is extended from a rear end of the continuous button 15, and a buckle slot 437 allowing the buckle hook 152 to be buckled is formed in the safety switch 43 at a location corresponding to the buckle hook 152.

When the safety switch 43 is in a pressed status, the safety switch 43 is pressed by the user, the recovery spring 151 is compressed, and the safety switch 43 is no longer required to be pressed by the user, thus the buckle slot 437 and the buckle hook 152 are in a buckled status, and the safety switch 43 is unable to return to the initial position, and the pressing plate 433 is able to continuously press the gas discharging press plate 34 for allowing the gas discharging valve 31 to be kept in a gas supplying status, thus an inconvenience of requiring the user to continuously press the safety switch 43 can be avoided.

When the gas supplying status is desired to be terminated, the user only has to press the continuous button 15 again to allow the buckle hook 152 to be released from the buckle slot 437, meanwhile an energy releasing effect is provided by the recovery spring 151 for enabling the continuous button 15 to be recovered to the initial non-operated position.

Based on what has been disclosed above, advantages achieved by the present invention are as follows. The combusting angle can be adjusted with respect to various operation spaces, thus disadvantages of the conventional device being formed with a fixed combusting angle relative to the handgrip part and wasting money for buying gas combustion tools with various angles can be overcome. Accordingly, the gas combustor having function of adjusting combusting angle provided by the present invention is novel and more practical in use comparing to prior arts.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A gas combustor having function of adjusting combusting angle, including:
   a fixed housing, having a left housing part and a right housing part, wherein a gas storage cylinder is disposed in said fixed housing, a top end of one of said left housing part and said right housing part is transversally formed with a rod hole and at least one insertion hole; and
   a rotary housing, pivoted with said fixed housing and connected to a combusting device, wherein one side of said rotary housing is formed with a first shaft hole having a plurality of annularly-arranged teeth slots for receiving a locking mechanism having an unlocking press button, a connection rod extrudes from an inner surface of the unlocking press button to pass the first shaft hole, be sleeved with a stretch spring and enter the rod hole, the connection rod is connected to a passive member in the fixed housing, the passive member has at least one convex tooth protruding toward the plurality of teeth slots, and each of the at least one convex tooth is to be inserted and positioned in one of the teeth slots to form a locked status;
   when said unlocking press button is pressed, said stretch spring is compressed, said passive member is able to be inwardly displaced with said connection rod, and said at least one convex tooth is released from said teeth slots, thereby terminating said locked status, and said unlocking press button is served as an axial core of said first shaft hole, so that said rotary housing having said combusting device is able to be directly rotated and adjusted till a desired combusting angle is provided;
   wherein adjacent surfaces of said connection rod and said first shaft hole are oppositely formed with at least one convex tenon and at least one tenon slot for preventing said unlocking press button from rotating.

2. The gas combustor having function of adjusting combusting angle as claimed in claim 1, furthering including a gas discharging device, wherein the gas discharging device has a gas discharging valve disposed at a top end of said gas storage cylinder, a gas conveying soft pipe having an upstream end thereof sleeved with said gas discharging valve and penetrating a penetrated slot formed at a top end of said fixed housing, a gas ejecting nozzle disposed at a downstream end of said gas conveying soft pipe, and a gas discharging press plate having one end thereof sleeved with said gas discharging valve; wherein said gas discharging press plate is pivoted in said fixed housing, one end thereof is sleeved with said gas discharging valve, and another end thereof is abutted against an igniting device; wherein said penetrated slot is formed in said rod hole and arranged at one side of said at least one insertion hole; wherein said igniting device has a pressing unit and a piezoelectric device; a pair of slide rails and a pair of rail slots are formed on a pair of side walls of said pressing unit and a pair of inner walls of said fixed housing to allow said pair of slide rails and said pair of rail slots to be mutually engaged and said pair of slide rails to slide in said pair of rail slots, so that said pressing unit is able to longitudinally slide in said fixed housing, thereby enabling said piezoelectric device disposed between said pair of inner walls to be pressed; a bottom end of said piezoelectric device is abutted against a blocking sheet disposed on said pair of inner walls; and said piezoelectric device has a conductive wire and a return wire both passing said penetrated slot and extending into said combusting device.

3. The gas combustor having function of adjusting combusting angle as claimed in claim 2, wherein a pressing handle protrudes from an inner side of said pressing unit toward said gas discharging press plate and is disposed above said gas discharging press plate, a press button is disposed at an opposite side of said pressing handle to protrude out of a button slot formed on said fixed housing; when said press button is pressed, said pressing handle enables a leverage effect to be generated at another end of said gas discharging press plate for allowing said gas discharging valve to be lifted so as to form an opened status, and said liquid gas in said gas storage cylinder is vaporized so as to enter said gas conveying soft pipe from said gas discharging valve and ejected from said gas ejecting nozzle to enter said combusting device; a current generated through said piezoelectric device being pressed by said pressing unit is transferred by said conductive wire, and a spark is generated at a location of a flame nozzle inside said combusting device, thereby allowing a mixed fuel gas to be ignited, and said return wire is utilized for guiding said current back to said piezoelectric device, so as to form an electric circulating loop.

4. The gas combustor having function of adjusting combusting angle as claimed in claim 2, wherein said pressing unit further has a safety switch, said safety switch is disposed and slidable in an accommodation slot formed at a top end of said pressing unit, a convex button protrudes an outer side of said safety switch to penetrate a key hole formed on said fixed housing, and a pair of wing sheets and a pair of wing slots allowing said pair of wing sheets to slide are oppositely formed at two sides of said safety switch and corresponding adjacent surfaces of said accommodation slot, an inner side of said safety switch is disposed with a spring tenon allowing one end of an auxiliary spring to be sleeved, and another end of said auxiliary spring is abutted against a rear wall formed in said accommodation slot, so that said safety switch is able to elastically retract and slide in said accommodation slot; when said safety switch is not in an operating status, said convex button longitudinally abuts against said key hole, thus said press button is unable to be pressed, thereby forming a locked status.

5. The gas combustor having function of adjusting combusting angle as claimed in claim 4, wherein an outer side of said convex button is formed with an arc-shaped end, and a guiding arc-shaped surface is connected to an inner bottom end of said key hole; when said convex button is pressed for allowing said convex button to be inwardly displaced, said auxiliary spring is compressed, so that said arc-shaped end is able to enter said key hole and be located above said guiding arc-shaped surface, thereby forming an unlocked status.

6. The gas combustor having function of adjusting combusting angle as claimed in claim 2, wherein said fixed housing further has a continuous button, said continuous button is disposed and slidable in a button hole of said fixed housing, an inner end of said continuous button is disposed with a buckle hook, and a buckle slot allowing said buckle hook to be buckled is disposed in said pressing unit at a location corresponding to said buckle hook.

7. The gas combustor having function of adjusting combusting angle as claimed in claim 1, wherein said rotary housing is composed of a left inner housing part and a right inner housing part being engaged with each other, an opposite side of said first shaft hole is further formed with a second shaft hole, and said second shaft hole is served to allow a pivotal shaft, correspondingly formed at a top end of said fixed housing, to be sleeved.

8. The gas combustor having function of adjusting combusting angle as claimed in claim 3, wherein said combusting device has a base connected to said rotary housing, a positioning hole longitudinally formed on said base and allowing a mixing pipe to be received, a circumference of said positioning hole is radially extended with a plurality of wire slots allowing said conductive wire to pass and longitudinally protruded with a pipe slot allowing said return wire to be positioned; said gas ejecting nozzle is disposed at an upstream end defined inside said mixing pipe, and said flame nozzle is disposed at a downstream end of said mixing pipe after being sleeved in a heat insulating sleeve, thus a mixing chamber is formed between said upstream end and said downstream end, and said mixing chamber is formed with at least one air inlet hole arranged at a downstream end of said gas ejecting nozzle, and an opened end of said heat insulating sleeve is disposed with a conductive ring spaced from said flame nozzle with an interval.

9. The gas combustor having function of adjusting combusting angle as claimed in claim 8, wherein said combusting device further has an outer pipe, a bottom end of said outer pipe is formed with a flange arranged at a top end of said base, and a locking ring is locked on said base, thus an inner block edge formed in a stepped outline and disposed inside said locking ring is able to press said flange, and said outer pipe is able to be fastened on said base and served to cover said mixing pipe, said flame nozzle and said heat insulating sleeve; wherein, at least one ventilation hole is further formed on an outer circumference of said outer pipe, so that air is able to be introduced from said ventilation hole, and allowed to enter said mixing chamber through said air inlet hole so as to be mixed with fuel gas to form said mixed fuel gas.

10. The gas combustor having function of adjusting combusting angle as claimed in claim 9, wherein said outer pipe is further connected to an inner pipe, an inner burning member is disposed in said inner pipe, and a block ring is provided, thereby preventing said inner burning member from being released from said inner pipe; said inner pipe is connected to a ferrochromium head; said conductive wire is in contact with said mixing pipe in said wire slot where said conductive wire is received, so that said current is able to pass said mixing pipe and said flame nozzle, and said spark is generated between said flame nozzle and said conductive ring, so that after said fuel gas ejected from said flame nozzle is ignited, said current is able to travel along said inner pipe and said outer pipe then be transferred back to said piezoelectric device via said return wire disposed in said wire slot and in contact with said outer pipe, thereby forming said electric circulating loop.

11. A gas combustor having function of adjusting combusting angle, including:
a fixed housing, having a left housing part and a right housing part, wherein one of said left housing part and said right housing part is formed with a rod hole; and
a rotary housing, pivoted with said fixed housing and connected to a combusting device, wherein one side of said rotary housing is formed with a shaft hole having a plurality of annularly-arranged teeth slots for receiving a locking mechanism having an unlocking press button, a connection rod extrudes from an inner surface of the unlocking press button to pass the shaft hole, be sleeved with a stretch spring and enter the rod hole, the connection rod is connected to a passive member in the fixed housing, the passive member has at least one convex tooth protruding toward the plurality of teeth slots, and each of the at least one convex tooth is to be inserted and positioned in one of the teeth slots to form a locked status;
when said unlocking press button is pressed, said stretch spring is compressed, said passive member is able to be inwardly displaced with said connection rod, and said at least one convex tooth is released from said teeth slots, thereby terminating said locked status, and said unlocking press button is served as an axial core of said shaft hole, so that said rotary housing having said combusting device is able to be directly rotated and adjusted till a desired combusting angle is provided;
wherein adjacent surfaces of said connection rod and said shaft hole are oppositely formed with at least one convex tenon and at least one tenon slot for preventing said unlocking press button from rotating.

12. The gas combustor having function of adjusting combusting angle as claimed in claim 11, wherein an inner circumference of said rod hole and a corresponding adjacent surface of said passive member are oppositely formed with at least one slide tenon and at least one slide slot for preventing said passive member from shaking when said passive member is sliding with said connection rod.

13. The gas combustor having function of adjusting combusting angle as claimed in claim 11, wherein a gas storage cylinder is disposed in said fixed housing;

a gas discharging device is further provided, said gas discharging device has a gas discharging valve disposed at a top end of said gas storage cylinder, a gas conveying soft pipe having an upstream end thereof sleeved with said gas discharging valve, a gas ejecting nozzle disposed at a downstream end of said gas conveying soft pipe, and a gas discharging press plate having one end thereof sleeved with said gas discharging valve; and an igniting device having has a fastening rack, a piezoelectric device and a safety switch; said fastening rack is disposed on a top surface of said gas storage cylinder.

14. The gas combustor having function of adjusting combusting angle as claimed in claim 13, wherein said fastening rack further has an accommodation slot allowing said piezoelectric device to be accommodated and positioned, and one free end of a conductive wire of said piezoelectric device is extended into a periphery of a flame nozzle of said combusting device, spaced from said flame nozzle with an interval; said fastening rack further has a support arm protruded for allowing said gas discharging press plate to be pivoted and inserted in one of said housing parts; and a penetrated hole allowing a positioning rod, protruded from an inner wall of one of said housing parts, to be received, and said positioning rod is inserted in a positioning hole correspondingly formed on an inner wall of said another housing part; wherein, two sides of said fastening rack are respectively protruded with at least one latch tenon, each said latch tenon is inserted in a corresponding one of tenon holes formed on said inner walls of said left housing part and said right housing part.

15. The gas combustor having function of adjusting combusting angle as claimed in claim 14, wherein said combusting device has a support arm, a middle portion of said support arm is formed with a connection part capable of being connected with an outer pipe, said connection part is formed with at least one air inlet hole; said outer pipe allows said conductive wire to pass and is served to cover said flame nozzle, so that combusting flame is able to be ejected from an opened end of said outer pipe.

16. The gas combustor having function of adjusting combusting angle as claimed in claim 15, wherein said flame nozzle is disposed in a heat insulating member made of a ceramic material, said heat insulation member is disposed in said outer pipe, one end of said heat insulating member is abutted against an inward-retracting edge at said opened end of said outer pipe, an elastic unit is disposed between anther end of said heat insulating member and a convex ring of said support arm, thereby enabling said heat insulating member to be positioned in said opened end of said outer pipe; and said conductive wire is allowed to pass said connection part, said outer pipe and said heat insulating member, and arranged at a periphery of said flame nozzle.

17. The gas combustor having function of adjusting combusting angle as claimed in claim 13, wherein a front end and a top end of said fixed housing are respectively formed with an opened slot allowing said combusting device and said rotary housing to rotate, a front bottom side of said opened slot is connected to said safety switch, a back side of said safety switch has a press block capable of pressing said piezoelectric device, and a pressing plate enabling said gas discharging press plate to generate a leverage effect.

18. The gas combustor having function of adjusting combusting angle as claimed in claim 17, wherein said safety switch further has a lock bolt capable of transversally sliding and abutting against of a stop block of said fastening rack while being in a non-sliding status, thereby forming a locking and non-pressing status; said lock bolt is able to transversally displace with a slide member disposed at a front end of said safety switch, so that said lock bolt is able to be released from said stop block for forming an unlocking and pressing status; wherein said safety switch further has an auxiliary spring capable of abutting against a stop wall of said fastening rack.

19. The gas combustor having function of adjusting combusting angle as claimed in claim 17, wherein said fixed housing further has a continuous button, said continuous button is disposed in a button hole of said fixed housing, and a recovery spring is disposed between said continuous button and said button hole, a buckle hook is extended from a rear end of said continuous button, and a buckle slot allowing said buckle hook to be buckled is formed in said safety switch at a location corresponding to said buckle hook; when said safety switch is in a pressed status, and said continuous button is pressed, said recovery spring is compressed by said continuous button, said buckle slot and said buckle hook are in a buckled status, and said safety switch is unable to return to an initial position, and said pressing plate is able to continuously press said gas discharging press plate for allowing said gas discharging valve to be kept in a gas supplying status.

20. The gas combustor having function of adjusting combusting angle as claimed in claim 11, wherein said connection rod is provided with a buffering pad arranged at a location adjacent to said passive member, and said buffering pad is able to absorb noises.

21. The gas combustor having function of adjusting combusting angle as claimed in claim 11, wherein an inner circumference of said rod hole is provided with at least one latch hook, each said latch hook is able to latch a corresponding latch slot formed on said fastening rack.

* * * * *